Patented Mar. 7, 1950

2,499,367

UNITED STATES PATENT OFFICE 2,499,367

CHEMICAL MANUFACTURE

Melvin De Groote, University City, and Bernhard Keiser, Webster Groves, Mo., assignors to Petrolite Corporation, Ltd., Wilmington, Del., a corporation of Delaware No Drawing. Application February 16, 1948, Serial No. 8,724. In Venezuela March 7, 1947

18 Claims. (Cl. 252—342)

This invention relates to processes and procedures particularly adapted for preventing, breaking, or resolving emulsions of the water-in-oil type, and particularly petroleum emulsions. It is a continuation-in-part of co-pending applications Serial Nos. 518,660 and 518,661, both filed January 17, 1944; Serial Nos. 666,817 and 666,821, both filed May 2, 1946; Serial Nos. 666,818 and 666,816, filed May 2, 1946; Serial Nos. 727,282 and 727,283, both filed February 7, 1947; Serial Nos. 751,610 and 751,605, filed May 31, 1947; and Serial No. 751,611, filed May 31, 1947, all now abandoned.

New chemical products or compounds, as well as the application of such chemical compounds, products, and the like, in various other arts and industries, along with methods for manufacturing said new chemical products or compounds which are of outstanding value in demulsification, described herein are described and claimed in our co-pending applications, Serial Nos. 751,623 and 751,620 filed May 31, 1947, both now abandoned, and also our co-pending application, Serial No. 8,725 filed February 16, 1948, as well as our co-pending applications, Serial No. 8,731 filed February 16, 1948, and Serial No. 42,134 filed August 2, 1948. Attention is also directed to our aforementioned co-pending application Serial No. 751,611 filed May 31, 1947.

Our invention provides an economical and rapid process for resolving petroleum emulsions of the water-in-oil type that are commonly referred to as "cut oil," "roily oil," "emulsified oil," etc., and which comprises fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil, relatively soft waters or weak brines. Controlled emulsification and subsequent demulsification under the conditions just mentioned are of significant value in removing impurities, particularly inorganic salts from pipeline oil.

Demulsification as contemplated in the present application includes the preventive step of commingling the demulsifier with an aqueous component which would or might subsequently become either phase of the emulsion in the absence of such precautionary measure. Similarly, such demulsifier may be mixed with the hydrocarbon component.

In our co-pending applications above referred to we have described certain new products or compositions of matter which are of unusual value in certain industrial applications requiring the use of products or compounds showing surface activity. We have found that if solvent-soluble resins are prepared from difunctional (direactive) phenols in which one of the reactive (o or p) positions of the phenol is substituted by an atom or radical which, if containing carbon, does not have more than 24 carbon atoms, in the substantial absence of trifunctional phenols, and aldehydes having not over 8 carbon atoms, subsequent oxyalkylation, and specifically oxyethylation, yields products of unusual value for demulsification purposes provided that oxyalkylation is continued to the degree that hydrophile properties are imparted to the compound. By "substantial absence of trifunctional phenols," we mean that such materials may be present only in amounts so small that they do not interfere with the formation of a solvent-soluble resin product, and, especially of a hydrophile oxyalkylated derivative thereof. The actual amounts to be tolerated will, of course, vary with the nature of the other components of the system; but in general the proportion of trifunctional phenols which is tolerable in the conventional resinification procedures illustrated herein is quite small. In experiments following conventional procedure using an acid catalyst in which we have included trifunctional phenols in amounts of from 3% to about 1% or somewhat less, based on the difunctional phenols, we have encountered difficulties in preparing oxyalkylated derivatives of the type useful in the practice of this invention.

Attention is directed to ten co-pending applications:

(1) In respect to the use of demulsifying agents of the kind above described with the proviso that the hydrocarbon substitutent in the phenolic nucleus has 4 to 8 carbon atoms, we refer to our co-pending application for patent, Serial No. 727,282 filed February 7, 1947 (abandoned).

(2) In respect to the same products as new compositions or as new products valuable for various purposes in addition to demulsification, attention is directed to our co-pending application, Serial No. 751,619, filed May 31, 1947 (abandoned).

(3) In respect to the use of demulsifying agents of the kind above described with the proviso that the hydrocarbon substituent in the phenolic nucleus has 9 to 18 carbon atoms, we refer to our co-pending application, Serial No. 751,608 filed May 31, 1947 (abandoned).

(4) In respect to the same products as new compositions or as new products valuable for various purposes in addition to demulsification, attention is directed to our co-pending application, Serial No. 751,618 filed May 31, 1947 (abandoned).

(5) In respect to the use of demulsifying agents of the kind described, with the proviso that the hydrocarbon substituent in the phenolic nucleus has at least 2 and not more than 3 carbon atoms, we refer to our copending application for patent, Serial No. 751,606 filed May 31, 1947 (abandoned).

(6) In respect to the same products as new compositions or as new products valuable for various purposes in addition to demulsification, attention is directed to our co-pending application, Serial No. 751,617 filed May 31, 1947 (abandoned).

(7) In respect to the use of demulsifying agents which may be derived from phenolic reactants enumerated in the preceding categories, one may additionally employ as phenolic reactants cresols, xylenols, and substituted phenols in which the substituent has 19 to 24 carbon atoms. In connection with these compounds, particularly for use as demulsifying agents, attention is directed to our co-pending application, Serial No. 751,610 filed May 31, 1947 (abandoned).

(8) In respect to the same products as new compositions or as new products valuable for various purposes in addition to demulsification, attention is directed to our co-pending application, Serial No. 751,623, filed May 31, 1947 (abandoned).

(9) In respect to the use of demulsifying agents of the kind described, with the proviso that the hydrocarbon substituent in the phenolic nucleus has at least 2 and not more than 24 carbon atoms, and with particular reference to mixtures in which phenols, having 4 to 8 carbon atoms in the substituent position, are mixed with phenols having 2 to 3 or 9 to 24 carbon atoms, reference is made to our co-pending application, Serial No. 8,728, filed February 16, 1948.

(10) In respect to the same products as new compositions or as new products valuable for various purposes in addition to demulsification, attention is directed to our co-pending application, Serial No. 8,729, filed February 16, 1948.

With respect to thermoplastic phenol-aldehyde resins from difunctional phenols, it is well known that the substituent which makes the phenol difunctional need not be a hydrocarbon radical but may be an atom, such as chlorine or bromine, or may be a radical which, in addition to having carbon and hydrogen present, may also have oxygen, or nitrogen or both. Well known examples are resins prepared from chlorinated phenols, from salicylic acid, from para-hydroxybenzoic acid, from esters of such carboxylic acids as methylsalicylate, from phenols in which the substituent in the 2,4,6 position is a hydroxyalkyl radical, a ketone radical, an aminoalcohol radical, a chlorinated hydrocarbon radical, etc. Of particular interest are phenols where R is carboalkoxy (carbalkoxy) such as carbomethoxy, carbethoxy, etc. Thus, the instant application is concerned with the use of compounds derived from phenolic resins in which the phenol is substituted in the 2,4,6 position, including the valuable class where the substituent radical in the phenolic nucleus which renders the phenol difunctional is not a hydrocarbon radical but is of a different type.

One useful type of compound herein employed may be exemplified in an idealized simplification in the following formula:

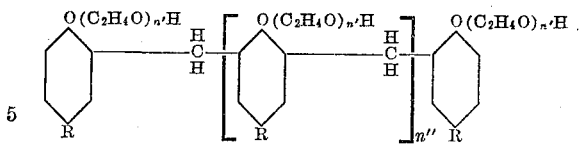

which, in turn, is considered a derivative of the fusible, organic solvent-soluble resin polymer:

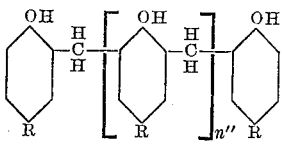

In these formulas $n''$ represents a numeral varying from 1 to 13 or even more provided that the parent resin is fusible and organic solvent-soluble; $n'$ represents a numeral varying from 1 to 20 with the proviso that the average value of $n'$ be at least 2; and R is a substituent atom or radical, and if a radical containing carbon, does not have more than 24 carbon atoms. These numerical values of $n'$ and $n''$ are, of course, on a statistical basis.

The present invention involves the use, as a demulsifier, of a hydrophile oxyalkylated 2,4,6 (i. e. 2,4 or 6) substituted monocyclic phenol-$C_1$ to $C_3$ aldehyde resin in which the ratio of oxyalkylene groups to phenolic nuclei is at least 2:1 and the alkylene radicals of the oxyalkylene groups are ethylene, propylene, butylene, hydroxy propylene or hydroxy butylene, corresponding to the alpha-beta alkylene oxides, ethylene oxide, alpha-beta propylene oxide, alpha-beta butylene oxide, glycide and methylglycide.

One may employ products derived from resins obtained with the use of mixtures of phenols, for instance, mixtures of cresols and other hydrocarbon substituted phenols, or mixtures in which all the phenols are hydrocarbon substituted, or mixtures of phenols in which the substituent is other than hydrocarbon, or mixtures in which some of the phenols are substituted by a hydrocarbon, or mixtures in which some of the phenols are substituted by a hydrocarbon radical and others are not. Some of these mixtures will be illustrated subsequently.

More particularly, the present invention involves the use as a demulsifier of a compound having the following characteristics:

(1) Essentially a polymer, probably linear but not necessarily so, having at least 3 and preferably not over 15 or 20 phenolic or structural units. It may have more, as previously stated.

(2) The parent resin polymer being fusible and organic solvent-soluble as hereinafter described.

(3) The parent resin polymer being free from cross-linking or structure which cross-links during the heating incident to the oxyalkylation procedure to an extent sufficient to prevent the possession of hydrophile or sub-surface-active or surface-active properties by the oxyalkylated resin. Minor proportions of trifunctional phenols sometimes present in commercial phenols are usually harmless.

(4) Each alkyleneoxy group is introduced at the phenolic hydroxyl position except possibly in an exceptional instance where a stable methylol group has been formed by virture of resin manufacture in presence of an alkaline catalyst, and in instances in which the substituent has a labile or reactive hydrogen atom, as in resins derived from salicylic acid, which is not suitably blocked prior to oxyalkylation. Occurrence of a stable methylol radical is the exception rather than the rule, and in any event apparently does not occur when the resin is manufactured in the presence of an acid catalyst, but a number of valuable products are obtained from resins in which the substituent radical is oxyalkylation-susceptible.

(5) The total number of alkyleneoxy radicals introduced must be at least equal to twice the phenolic nuclei.

(6) The number of alkyleneoxy radicals introduced not only must meet the minimum of item (5) above but also must be sufficient to endow the product with sufficient hydrophile property, to have emulsifying properties, or be self-emulsifiable, or self-dispersible, or the equivalent, as hereinafter described. The invention is concerned particularly with the use of sub-surface-active and surface-active compounds.

(7) The use of a product derived from a para-substituted phenol is advantageous, as compared with the use of a product derived from an ortho-substituted phenol, when both are available. This preference is based not only on the fact that the para-substituted phenol is usually cheaper, but also where we have been able to make a comparison it appears to be definitely better in effectiveness of demulsifiers.

We have found when oxyalkylated derivatives are obtained conforming to the above specifications, particularly in light of what is said hereinafter in greater detail, that they have unusual properties which can be better understood perhaps in light of the following:

(a) The property is not uniformly inherent in every analogous structure for the reason that if the methylene group is replaced by sulfur, for example, we have found such compounds to be of lesser value.

(b) Similarly, the property is not uniformly inherent in every analogous structure, for the reason that if R is chlorine, for example, the compounds obtained are of reduced value in comparison with compounds obtained from para-ethylphenol or para-propylphenol, or ortho-ethylphenol or ortho-propylphenol, while products obtained from phenols where R represents ethyl or propyl are of reduced value for demulsification, in comparison with compounds derived, for example, from difunctional butylphenol, difunctional amylphenol, difunctional octylphenol, difunctional nonylphenol, difunctional decylphenol, difunctional menthylphenol, etc., and derivatives of ortho or paracresol are of reduced value as compared with the ethyl and propyl phenol derived compounds.

(c) We know of no theoretical explanation of the unusual properties of this particular class of compounds and, as a matter of fact, we have not been able to find a satisfactory explanation even after we have prepared and studied several hundred typical compounds.

We have also found that the remarkable properties of the parent materials as demulsifiers persist in derivatives which bear a simple genetic relationship to the parent material, and in fact to the ultimate resin polymer, for instance, in the products obtained by reaction of the oxyalkylated compounds with low molal monocarboxy acids, high molal monocarboxy acids, polycarboxy acids, or their anhydrides, alpha-chloro monocarboxy acids, epichlorohydrin, etc. The derivatives also preferably must be obtained from oxyalkylated products showing at least the necessary hydrophile properties per se.

As previously stated, the present invention is concerned primarily with the resolution of petroleum emulsions of the water-in-oil type by means of certain specified demulsifiers. The specified demulsifiers are the products obtained by the oxyalkylation of certain resins, which in turn are derived by chemical reaction between difunctional monohydric phenols and a reactive aldehyde, such as formaldehyde, nearby homologues and their equivalents. The phenolic reactant is characterized by one ortho-para nuclear substituent, which, if hydrocarbon, has not over 24 carbon atoms. Usually the phenolic reactants are derivatives of hydroxy-benzene, i. e., ordinary phenol, but similar phenolic reactants obtained from metacresol or 3,5-xylenol are equally satisfactory for the reason that such phenols are still difunctional (direactive) and the presence of the single or even both methyl radicals does not materially affect the sub-surface-activity or the surface-activity or hydrophile balance. The substituent in the R position, if organic, may be alkyl, alkylene, aryl, alicyclic, or arylalkyl, or may contain some element or elements in addition to carbon and hydrogen.

Any aldehyde capable of forming a methylol or a substituted methylol group and having not more than 8 carbon atoms is satisfactory, so long as it does not possess some other functional group or structure which will conflict with the resinification reaction or with the subsequent oxyalkylation of the resin, but the use of formaldehyde, in its cheapest form of an aqueous solution, for the production of the resins is particularly advantageous. Solid polymers of formaldehyde are more expensive and higher aldehydes are both less reactive, and are more expensive. Furthermore, the higher aldehydes may undergo other reactions which are not desirable, thus introducing difficulties into the resinification step. Thus acetaldehyde, for example, may undergo an aldol condensation, and it and most of the higher aldehydes enter into self-resinification when treated with strong acids or alkalies. On the other hand, higher aldehydes frequently beneficially affect the solubility and fusibility of a resin. This is illustrated, for example, by the different characteristics of the resin prepared from para-tertiary amylphenol and formaldehyde on one hand and a comparable product prepared from the same phenolic reactant and heptaldehyde on the other hand. The former, as shown in certain subsequent examples, is a hard, brittle solid, whereas the latter is soft and tacky, and obviously easier to handle in the subsequent oxylalkylation procedure.

Cyclic aldehydes may be employed, particularly benzaldehyde. The employment of furfural requires careful control for the reason that in addition to its aldehydic function, furfural can form vinyl condensations by virtue of its unsaturated structure. The production of resins from furfural for use in preparing products for the present process is most conveniently conducted with weak alkaline catalysts and often with alkali metal carbonates. Useful aldehydes, in addition to formaldehyde, are acetaldehyde, propionic aldehyde, butyraldehyde, 2-ethylhexanal, ethylbutyraldehyde, heptaldehyde, and benzaldehyde, furfural and glyoxal. It would appear that the use of glyoxal should be avoided due to the fact that it is tetrafunctional. However, our experience has been that, in resin manufacture and particularly as described herein, apparently only one of the aldehyde functions enters into the resinification reaction. The inability of the other aldehydic function to enter into the reaction is presumably due to steric hindrance. Needless to say, one can use a mixture of two or more aldehydes although usually this has no advantage.

Resins of the kind which are used as intermediates for the compounds used in the practice of this invention are obtained with the use of acid catalysts or alkaline catalysts, or without the use of any catalyst at all. Among the useful alkaline catalysts are ammonia, amines, and quaternary ammonium bases. It is generally accepted that when ammonia and amines are employed as catalysts they enter into the condensation reaction and, in fact, may operate by initial combination with the aldehydic reactant. The compound hexamethylenetetramine illustrates such a combination. In light of these various reactions it becomes difficult to present any formula which would depict the structure of the various resins prior to oxyalkylation. More will be said subsequently as to the difference between the use of an alkaline catalyst and an acid catalyst; even in the use of an alkaline catalyst there is considerable evidence to indicate that the products are not identical where different basic materials are employed. The basic materials employed include not only those previously enumerated but also the hydroxides of the alkali metals, hydroxides of the alkaline earth metals, salts of strong bases and weak acids such as sodium acetate, etc.

Suitable phenolic reactants include the following: para- and ortho-cresol; para- and ortho-ethyl-phenol; 3-methyl-4-ethyl-phenol; 3-methyl-4-propyl-phenol; 2-ethyl-3-methyl-phenol; 2-propyl-3-methyl-phenol; para- and ortho-propyl-phenol; para-tertiary-butyl-phenol; para-secondary-butyl-phenol; para-tertiary-amyl-phenol; para-secondary-amyl-phenol; para-tertiary-hexyl-phenol; para-isooctyl-phenol; ortho-phenyl-phenol; para-phenyl-phenol; thymol; ortho-benzyl-phenol; para-benzyl-phenol; para-cyclohexyl-phenol; para-tertiary-decyl-phenol; para-dodecyl-phenol; para-tetradecyl-phenol; para-octadecyl-phenol; para-nonyl-phenol; para-menthyl-phenol; para-eicosanyl-phenol; para-docosanyl-phenol; para-tetracosanyl-phenol; para-beta-naphthyl-phenol; para-alpha-naphthyl-phenol; para-pentadecyl-phenol; that of the formula

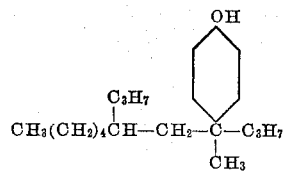

para-tertiary-alkyl-phenols of the formula

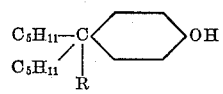

in which R is $C_9H_{19}$ to $C_{13}H_{27}$; para- and ortho-cetyl-phenols; para-cumyl-phenol; phenols of the formula

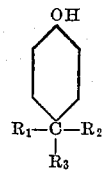

in which $R_1$ represents a straight chain hydrocarbon radical containing at least 7 carbon atoms and $R_2$ and $R_3$ represent hydrocarbon radicals the total number of carbon atoms attached to the tertiary carbon being at least 11; and phenols of the formula

in which $R_1$ represents an alkyl hydrocarbon radical containing at least 7 carbon atoms in a straight chain and $R_2$ represents an alkyl hydrocarbon radical containing at least 2 carbon atoms, the total number of carbon atoms in $R_1$ and $R_2$ being at least 11; the alkyl salicylates, including methyl salicylate, butyl salicylate, amyl salicylate, octyl salicylate, nonyl salicylate, dodecyl salicylate; benzyl salicylate, cyclohexyl salicylate, oleyl salicylate, styryl salicylate, phenoxy ethyl salicylate; p-hydroxy-ethyl-benzoate; salicylic acid; p-chlorophenol; o-chlorophenol; o- and p-dimethylaminomethyl-phenol; p-pentenyl-phenol; guaiacol; catechol; p-phenoxyphenol - p-hydroxybenzophenone; hydroxyphenylheptadecyl ketone; hydroxy-phenylheptadecenyl ketone; hydroxyphenylundecyl ketone; and the corresponding ortho-para substituted meta-cresols and 3,5-xylenols.

For convenience, the phenol has previously been referred to as monocyic in order to differentiate from fused nucleus polycyclic phenols, such as substituted naphthols. Specifically, "monocyclic" is limited to the nucleus in which the hydroxyl radical is attached. Broadly speaking, where a substituent is cyclic, particularly aryl, obviously in the usual sense such phenol is actually polycyclic although the phenolic hydroxyl is not attached to a fused polycyclic nucleus. Stated another way, phenols in which the hydroxyl group is directly attached to a condensed or fused polycyclic structure, are excluded. This matter, however, is clarified by the following consideration. The phenols herein contemplated for reaction may be indicated by the following formula:

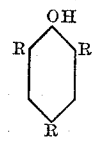

in which R is selected from the class consisting of hydrogen atoms and substituent radicals, which, if hydrocarbon, have not more than 24 carbon atoms, with the proviso that one occurrence of R is the substituent and the other two occurrences are hydrogen atoms, and with the further provision that one or both of the 3 and 5 positions may be methyl substituted.

The above formula possibly can be restated more conveniently in the following manner, to wit, that the phenol employed is of the following formula, with the proviso that R is a substituent located in the 2,4,6 position, again with the provision as to 3 or 3,5 methyl substitution. This is conventional nomenclature, numbering the various positions in the usual clockwise manner, beginning with the hydroxyl position as one:

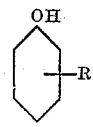

The manufacture of thermoplastic phenol-aldehyde resins, particularly from formaldehyde and a difunctional phenol, i. e., a phenol in which one of the three reactive positions (2,4,6) has been substituted is well known. As has been previously pointed out, there is no objection to a methyl radical in the 3 or 5 position.

Thermoplastic or fusible phenol-aldehyde resins are usually manufactured for the varnish trade and oil solubility is of prime importance. For this reason, common reactants employed are butylated phenols, amylated phenols, phenylphenols, etc. The methods employed in manufacturing such resins are similar to those employed in the manufacture of ordinary phenol-formaldehyde resins, in that either an acid or alkaline catalyst is usually employed. The procedure frequently differs from that employed in the manufacture of ordinary phenol-aldehyde resins in that phenol, being water-soluble, reacts readily with an aqueous aldehyde solution without further difficulty, while when a water-insoluble phenol is employed some modification is usually adopted to increase the interfacial surface and thus cause reaction to take place. A common solvent is sometimes employed. Another procedure employs rather severe agitation to create a large interfacial area. Once the reaction starts to a moderate degree, it is possible that both reactants are somewhat soluble in the partially reacted mass and assist in hastening the reaction. We have found it desirable to employ a small proportion of an organic sulfo-acid as a catalyst, either alone or along with a mineral acid like sulfuric or hydrochloric acid. For example, alkylated aromatic sulfonic acids are effectively employed. Since commercial forms of such acids are commonly their alkali salts, it is sometimes convenient to use a small quantity of such alkali salt plus a small quantity of strong mineral acid, as shown in the examples below. If desired, such organic sulfo-acids may be prepared in situ in the phenol employed, by reacting concentrated sulfuric acid with a small proportion of the phenol. In such cases where xylene is used as a solvent and concentrated sulfuric acid is employed, some sulfonation of the xylene probably occurs to produce the sulfo-acid. Addition of a solvent such as xylene is advantageous as hereinafter described in detail. Another variation of procedure is to employ such organic sulfo-acids, in the form of their salts, in connection with an alkali-catalyzed resinification procedure. Detailed examples are included subsequently.

Another advantage in the manufacture of the thermoplastic or fusible type of resin by the acid catalytic procedure is that, since a difunctional phenol is employed, an excess of an aldehyde, for instance formaldehyde, may be employed without too marked a change in conditions of reaction and ultimate product. There is usually little, if any, advantage, however, in using an excess over and above the stoichiometric proportions for the reason that such excess may be lost and wasted. For all practical purposes the molar ratio of formaldehyde to phenol may be limited to 0.9 to 1.2, with 1.05 as the preferred ratio, or sufficient, at least theoretically, to convert the remaining reactive hydrogen atom of each terminal phenolic nucleus. Sometimes when higher aldehydes are used an excess of aldehydric reactant can be distilled off and thus recovered from the reaction mass. This same procedure may be used with formaldehyde and excess reactant recovered.

When an alkaline catalyst is used the amount of aldehyde, particularly formaldehyde, may be increased over the simple stoichiometric ratio of one-to-one or thereabouts. With the use of alkaline catalyst it has been recognized that considerably increased amounts of formaldehyde may be used, as much as two moles of formaldehyde, for example, per mole of phenol, or even more, with the result that only a small part of such aldehyde remains uncombined or is subsequently liberated during resinification. Structures which have been advanced to explain such increased use of aldehydes are the following:

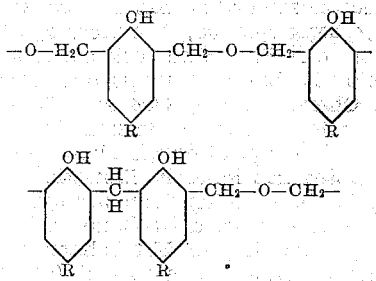

Such structures may lead to the production of cyclic polymers instead of linear polymers. For this reason, it has been previously pointed out that, although linear polymers have by far the most important significance, the present invention does not exclude resins of such cyclic structures.

Sometimes conventional resinification procedure is employed using either acid or alkaline catalysts to produce low-stage resins. Such resins may be employed as such, or may be altered or converted into high-stage resins, or in any event, into resins of higher molecular weight, by heating along with the employment of vacuum so as to split off water or formaldehyde, or both. Generally speaking, temperatures employed, particularly with vacuum, may be in the neighborhood of 175° to 250° C., or thereabouts.

It may be well to point out, however, that the amount for formaldehyde used may and does usually affect the length of the resin chain. Increasing the amount of the aldehyde, such as formaldehyde, usually increases the size or molecular weight of the polymer.

In the hereto appended claims there is specified, among other things, the resin polymer containing at least 3 phenolic nuclei. Such minimum molecular size is most conveniently determined as a rule by cryoscopic method using benzene, or some other suitable solvent, for instance, one of those mentioned elsewhere herein as a solvent for such resins. As a matter of fact, using the procedures herein described or any conventional resinification procedure will yield products usually having definitely in excess of 3 nuclei. In other words, a resin having an average of 4, 5 or 5½ nuclei per unit is apt to be formed as a minimum in resinification, except under certain special conditions where dimerization may occur.

However, if resins are prepared at substantially higher temperatures, substituting cymene, tetralin, etc., or some other suitable solvent which boils or refluxes at a higher temperature, instead of xylene, in subsequent examples, and if one doubles or triples the amount of catalyst, doubles or triples the time of refluxing, uses a marked excess of formaldehyde or other aldehyde, then the average size of the resin is apt to be distinctly over the above values, for example, it may average 7 to 15 units. Sometimes the expression "low-stage" resin or "low-stage" intermediate is employed to mean a stage having 6 or 7 units or even less. In the appended claims we have used "low-stage" to mean 3 to 7 units based on average molecular weight.

The molecular weight determinations, of course, require that the product be completely soluble in the particular solvent selected as, for instance, benzene. The molecular weight determination of such solution may involve either the freezing point as in the cryoscopic method, or, less conveniently perhaps, the boiling point in an ebullioscopic method. The advantage of the ebullioscopic method is that, in comparison with the cryoscopic method, it is more apt to insure complete solubility. One such common method to employ is that of Menzies and Wright (see J. Am. Chem. Soc. 43, 2309 and 2314 (1921)). Any suitable method for determining molecular weights will serve, although almost any procedure adopted has inherent limitations. A good method for determining the molecular weights of resins, especially solvent-soluble resins, is the cryoscopic procedure of Krumbhaar which employs diphenylamine as a solvent (see "Coating and Ink Resins," page 157, Reinhold Publishing Co. 1947).

Subsequent examples will illustrate the use of an acid catalyst, an alkaline catalyst, and no catalyst. As far as resin manufacture per se is concerned, we prefer to use an acid catalyst, and particularly a mixture of an organic sulfo-acid and a mineral acid, along with a suitable solvent, such as xylene, as hereinafter illustrated in detail. However, we have obtained products from resins obtained by use of an alkaline catalyst which were just as satisfactory as those obtained employing acid catalysts. Sometimes a combination of both types of catalysts is used in different stages of resinification. Resins so obtained are also perfectly satisfactory.

In numerous instances the higher molecular weight resins, i. e., those referred to as high-stage resins, are conveniently obtained by subjecting lower molecular weight resins to vacuum distillation and heating. Although such procedure sometimes removes only a modest amount or even perhaps no low polymer, yet it is almost certain to produce further polymerization. For instance, acid catalyzed resins obtained in the usual manner and having a molecular weight indicating the presence of approximately 4 phenolic units or thereabouts may be subjected to such treatment, with the result that one obtains a resin having approximately double this molecular weight. The usual procedure is to use a secondary step, heating the resin in the presence or absence of an inert gas, including steam, or by use of vacuum.

We have found that under the usual conditions of resinification employing phenols of the kind here described there is little or no tendency to form binuclear compounds, i. e., dimers resulting from the combination, for example, of two moles of a phenol and one mole of formaldehyde, particularly where the substituent is a hydrocarbon radical and contains 4 or 5 carbon atoms. Where the substituent is hydrocarbon and contains 9 carbon atoms or more there is an increased tendency to form a measurable amount of dimers. The cogeneric formation of a relatively small amount of dimers is unimportant and there is no reason to separate the dimers prior to oxyalkylation and use. Among the phenomena observed as a hydrocarbon substituent increases in size are the following:

(1) There is a tendency to form dimers, even when molar equivalents, or an excess of an aldehyde is used. This is probably related to one or more of the following: (a) decreased reactiveness or sluggishness due to the increased size of the reactant; (b) statistically less opportunity for reaction because the point of reaction, the reactive hydrogen atom, is diluted through greater molecular area or space; (c) the structure as such may afford decreased opportunity for reaction.

(2) There is an increased tolerance toward trifunctional phenols.

(3) Increasing the size of the side chain with a hydrocarbon substituent increases the carbon-oxygen ratio of the finished resin and ultimately causes greater solubility in hydrocarbon solvents.

Where the substituent is hydrocarbon and has three carbon atoms or less, there is little tendency to form dimers, but certain differences in behavior as compared with phenols having higher hydrocarbon substituents become significant and noticeable. Thus, they have a decreased tolerance toward trifunctional phenols, are more highly reactive, the carbon-oxygen ratio of the finished resin becomes less, ultimately causing decreased solubility in hydrocarbon solvents, and the tendency to form resins which harden, cure, or cross-link even though the phenol be difunctional increases.

Resins having substituents containing carbon, oxygen and hydrogen in general exhibit behavior paralleling that of the hydrocarbon-substituted phenol resins, in that if the substituent has a hydrocarbon radical of substantial size, as, for example, in dodecyl salicylate, the behavior of the resin tends to be similar to that of one obtained from a phenol with a higher hydrocarbon substituent, while if the substituent contains no such group, as in salicylic acid and methyl salicylate, the behavior tends to be similar to that of the resins derived from phenols having lower hydrocarbon substituents. Resins with substituents such as chlorine obtained, for example, from ortho- or para-chlorophenol, tend to behave like resins derived from cresols.

The substituted dihydroxy diphenyl methanes, i. e., dimers obtained from substituted phenols and aldehydes, are not resins as that term is used herein.

One need not use a single phenolic reactant, as mixtures of phenolic reactants give resins which are well adapted for the preparation of products used in the practice of the invention, and, in many cases, products obtained from mixtures of different phenolic reactants have advantages, either from the standpoint of production cost or demulsification effectiveness. Thus, the cresols, the ethyl phenols and the propyl phenols (difunctional in all cases) are obtainable at a cost of 50 to 60% of the cost of some of the other common difunctional phenols, such as butyl, amyl, octyl and nonyl phenols. A mixture of phenols giving a product of substantially the same effectiveness as that obtained from the more expensive phenol affords a definite economic advantage. Further, sometimes mixtures of phenols give products which appear to be more effective than products obtained from a single phenol. Thus, products obtained from mixtures of butyl or amyl phenol, methyl phenol, nonyl phenol, decyl phenol and other phenols in some instances appear to have a greater effectiveness than products obtained from single phenols, even though there is not any saving in cost in the production of products from such mixtures.

Because of low cost, mixtures in which cresol is one of the phenolic reactants are of particular importance. We have used mixtures employing a cresol and another phenol in molar ratios ranging from 1:9 to 9:1, and found them effective. Difunctional xylenols, although they give effective agents in mixtures of this kind, are usually more expensive and do not offer this economic advantage. Mixtures in which salicylic acid is one of the phenolic reactants or in which other phenols having a substituent with a reactive or labile hydrogen atom are used, are also of importance because the reactive group, such as the carboxyl group of salicylic acid, affords an opportunity for a number of variations such as reaction with amines, alcohols, and the like, to produce products of modified character which are useful in practicing the invention.

Although any conventional procedure ordinarily employed may be used in the manufacture of the herein contemplated resins or, for that matter, such resins may be purchased in the open market, we have found it particularly desirable to use the procedures described elsewhere herein, and employing a combination of an organic sulfo-acid and a mineral acid as a catalyst, and xylene as a solvent. By way of illustration, certain subsequent examples are included, but it is to be understood the herein described invention is not concerned with the resins per se or with any particular method of manufacture but is concerned with the use of derivatives obtained by the subsequent oxyalkylation thereof. The phenol-aldehyde resins may be prepared in any suitable manner.

Oxyalkylation, particularly oxyethylation which is the preferred reaction, depends on contact between a non-gaseous phase and a gaseous phase. It can, for example, be carried out by melting the thermoplastic resin and subjecting it to treatment with ethylene oxide or the like, or by treating a suitable solution or suspension. Since the melting points of the resins are often higher than desired in the initial stage of oxyethylation, we have found it advantageous to use a solution or suspension of thermoplastic resin in an inert solvent such as xylene. Under such circumstances, the resin obtained in the usual manner is dissolved by heating in xylene under a reflux condenser or in any other suitable manner. Since xylene or an equivalent inert solvent is present or may be present during oxyalkylation, it is obvious there is no objection to having a solvent present during the resinifying stage if, in addition to being inert towards the resin, it is also inert towards the reactants and also inert towards water. Numerous solvents, particularly of aromatic or cyclic nature, are suitably adapted for such use. Examples of such solvents are xylene, cymene, ethyl benzene, propyl benzene, mesitylene, decalin (decahydronaphthalene), tetralin (tetrahydronaphthalene), ethylene glycol diethylether, diethylene glycol diethylether, and tetraethylene glycol dimethylether, or mixtures of one or more. Solvents such as dichloroethylether, or dichloropropylether may be employed either alone or in mixture but have the objection that the chlorine atom in the compound may slowly combine with the alkaline catalyst employed in oxyethylation. Suitable solvents may be selected from this group for molecular weight determinations.

The use of such solvents is a convenient expedient in the manufacture of the thermoplastic resins, particularly since the solvent gives a more liquid reaction mass and thus prevents overheating, and also because the solvent can be employed in connection with a reflux condenser and a water trap to assist in the removal of water of reaction and also water present as part of the formaldehyde reactant when an aqueous solution of formaldehyde is used. Such aqueous solution, of course, with the ordinary product of commerce containing about 37½% to 40% formaldehyde, is the preferred reactant. When such solvent is used it is advantageously added at the beginning of the resinification procedure or before the reaction has proceeded very far.

The solvent can be removed afterwards by distillation with or without the use of vacuum, and a final higher temperature can be employed to complete reaction if desired. In many instances it is most desirable to permit part of the solvent, particularly when it is inexpensive, e. g., xylene, to remain behind in a predetermined amount so as to have a resin which can be handled more conveniently in the oxyalkylation stage. If a more expensive solvent, such as decalin, is employed, xylene or other inexpensive solvent may be added after the removal of decalin, if desired.

If the phenol used in preparing the resin has a reactive or labile hydrogen atom other than the phenolic hydrogen, as for example, a carboxy radical as in salicylic acid, it is frequently of advantage to block this radical, as by esterification, prior to oxyalkylation, although, if desired, this reactive position may be oxyalkylated along with the phenolic hydroxyls. Thus, resins derived from such phenols as salicylic acid can be reacted with reagents such as alcohols, ethylene glycol, glycerol, triethanolamine, other amines, and the like, prior to oxyalkylation. Resins prepared from phenols having ester-linked substituents, such as methyl salicylate may, prior to oxyalkylation, be subjected to alcoholysis or reesterification to replace a portion of the ester linked radical with another group which imparts to the final product improved characteristics. Thus, methyl salicylate is the least expensive salicylate. It is readily converted to aldehyde linked resins, which on oxyalkylation give useful products; but products in which the methyl group of such a resin is replaced by alcoholysis by a higher radical, such as results from alcoholysis with hexyl alcohol, amyl alcohol, butyl alcohol, benzyl alcohol, decyl alcohol, cyclohexyl alcohol, oleyl alcohol, styryl alcohol, and the like, on oxyalkylation give still more effective demulsifying agents. As a matter of fact the most valuable materials prepared with the use of salicylic acid as a resinogen are materials in which the salicylic acid is used in admixture with other phenols, as, for example, in resins produced from about four molar proportions of para-amyl-phenol and one molar proportion of salicylic acid.

In preparing resins from difunctional phenols it is common to employ reactants of technical grade. The substituted phenols herein contemplated are usually derived from hydroxy-benzene. As a rule, such substituted phenols are comparatively free from unsubstituted phenol. We have generally found that the amount present is considerably less than 1% and not infrequently in the neighborhood of $\frac{1}{10}$ of 1%, or even less. The amount of the usual trifunctional phenol, such as hydroxybenzene or metacresol, which can be tolerated is determined by the fact that actual cross-linking, if it takes place even infrequently, must not be sufficient to cause insolubility at the completion of the resinification stage or the lack of hydrophile properties at the completion of the oxyalkylation stage.

The exclusion of such trifunctional phenols as hydroxybenzene or metacresol is not based on the fact that the mere random or occasional inclusion of an unsubstituted phenyl nucleus in the resin molecule or in one of several molecules, for example, markedly alters the characteristics of the oxyalkylated derivative. The presence of a phenyl radical having a reactive hydrogen atom available or having a hydroxymethyl or a substituted hydroxymethyl group present is a potential source of cross-linking either during resinification or oxyalkylation. Cross-linking leads either to insoluble resins or to non-hydrophilic products resulting from the oxyalkylation procedure. With this rationale understood, it is obvious that trifunctional phenols are tolerable only in a minor proportion and should not be present to the extent that insolubility is produced in the resins, or that the product resulting from oxyalkylation is gelatinous, rubbery, or at least not hydrophile. As to the rationale of resinification, note particularly what is said hereafter in differentiating between resoles, Novolaks, and resins obtained solely from difunctional phenols. The increased tolerance of phenols with relatively large substituent groups toward the presence of trifunctional phenols has already been pointed out.

Previous reference has been made to the fact that fusible organic solvent-soluble resins are usually linear but may be cyclic. Such more complicated structure may be formed, particularly if a resin prepared in the usual manner is converted into a higher stage resin by heat treatment in vacuum as previously mentioned. This again is a reason for avoiding any opportunity for cross-linking due to the presence of any appreciable amount of trifunctional phenol. In other words, the presence of such reactant may cause cross-linking in a conventional resinification procedure, or in the oxyalkylation procedure, or in the heat and vacuum treatment if it is employed as part of resin manufacture.

Our routine procedure in examining a phenol for suitability for preparing products to be used in practicing the invention is to prepare a resin employing formaldehyde in excess (1.2 moles of formaldehyde per mole of phenol) and using an acid catalyst in the manner described hereinafter in Example 1a. If the resin so obtained is solvent-soluble in any one of the aromatic or other solvents previously referred to, it is then subjected to oxyethylation. During oxyethylation a temperature is employed of approximately 150° to 165° C. with addition of at least 2 and advantageously up to 5 moles of ethylene oxide per phenolic hydroxyl. The oxyethylation is advantageously conducted so as to require from a few minutes up to 5 to 10 hours. If the product so obtained is solvent-soluble and self-dispersing or emulsifiable, or has emulsifying properties, the phenol is perfectly satisfactory from the standpoint of trifunctional phenol content. The solvent may be removed prior to the dispersibility or emulsifiability test. When a product becomes rubbery during oxyalkylation due to the presence of a small amount of trireactive phenol, as previously mentioned, or for some other reason, it may become extremely insoluble, and no longer qualifies as being hydrophile as herein specified. Increasing the size of the aldehydic nucleus, for instance using heptaldehyde instead of formaldehyde, increases tolerance for trifunctional phenol.

The presence of a trifunctional or tetrafunctional phenol (such as resorcinol or bisphenol A) is apt to produce detectable cross-linking and insolubilization but will not necessarily do so, especially if the proportion is small. Resinification involving difunctional phenols only may also produce insolubilization, although this seems to be an anomaly or a contradiction of what is sometimes said in regard to resinification reactions involving difunctional phenols only. This is presumably due to cross-linking. This appears to be contradictory to what one might expect in light of the theory of functionality in resinification. It is true that under ordinary circumstances, or rather under the circumstances of conventional resin manufacture, the procedures employing difunctional phenols are very apt to, and almost invariably do, yield solvent-soluble, fusible resins. However, when conventional procedures are employed in connection with resins for varnish manufacture or the like, there is involved the matter of color, solubility in oil, etc. When resins of the same type are manufactured for the herein contemplated purpose, i. e., as a raw material to be subjected to oxyalkylation, such criteria of selection are no longer pertinent. Stated another way, one may use more drastic conditions of resinification than those ordinarily employed to produce resins for the present purposes. Such more drastic conditions of resinification may include increased amounts of catalyst, higher temperatures, longer time of reaction, subsequent reaction involving heat alone or in combination with vacuum, etc. Therefore, one is not only concerned with the resinification reactions which yield the bulk of ordinary resins from difunctional phenols but also and particularly with the minor reactions of ordinary resin manufacture which are of importance in the present invention for the reason that they occur under more drastic conditions of resinification which may be employed advantageously at times, and they may lead to cross-linking.

In this connection it may be well to point out that part of these reactions are now understood or explainable to a greater or lesser degree in light of a most recent investigation. Reference is made to the researches of Zinke and his co-workers, Hultzsch and his associates, and to von Eulen and his co-workers, and others. As to a bibliography of such investigations, see Carswell, "Phenoplasts," chapter 2. These investigators limited much of their work to reactions involving phenols having two or less reactive hydrogen atoms. Much of what appears in these most recent and most up-to-date investigations is pertinent to the present invention insofar that much of it is referring to resinification involving difunctional phenols.

For the moment, it may be simpler to consider a "most typical type" of fusible resin and forget for the time that such resin, at least under certain circumstances, is susceptible to further complications. Subsequently in the text it will be pointed out that cross-linking or reaction with excess formaldehyde may take place even with one of such "most typical type" resins. This point is made for the reason that insolubles must be avoided in order to obtain the products herein contemplated for use as demulsifying agents.

The "typical type" of fusible resin obtained from a para-blocked or ortho-blocked phenol is clearly differentiated from the Novolak type or resole type of resin. Unlike the resole type, such "typical type" para-blocked or ortho-blocked phenol resin may be heated indefinitely without passing into an infusible stage, and in this respect is similar to a Novolak. Unlike the Novolak type the addition of a further reactant, for instance, more aldehyde, does not ordinarily alter fusibility of the difunctional phenol-aldehyde type resin; but such addition to a Novolak causes cross-linking by virtue of the available third functional position.

What has been said immediately preceding is subject to modification in this respect: It is well known, for example, that difunctional phenols, for instance, paratertiaryamylphenol, and an aldehyde, particularly formaldehyde, may yield heat-hardenable resins, at least under certain conditions, as for example the use of two moles of formaldehyde to one of phenol, along with an alkaline catalyst. This peculiar hardening or curing or cross-linking of resins obtained from difunctional phenols has been recognized by various authorities.

The compounds herein used must be hydrophile or sub-surface-active or surface-active as hereinafter described, and this precludes the formation of insolubles during resin manufacture or the subsequent stage of resin manufacture where heat alone, or heat and vacuum, are employed, or in the oxyalkylation procedure. In its simplest presentation the rationale of resinification involving formaldehyde, for example, and a difunctional phenol would not be expected to form cross-links. However, cross-linking sometimes occurs and it may reach the objectionable stage. However, provided that the preparation of resins simply takes into cognizance the present knowledge of the subject, and employing preliminary, exploratory routine examinations as herein indicated, there is not the slightest difficulty in preparing a very large number of resins of various types and from various reactants, and by means of different catalysts by different procedures, all of which are eminently suitable for the herein described purpose.

Now returning to the thought that cross-linking can take place, even when difunctional phenols are used exclusively, attention is directed to the following: Somewhere during the course of resin manufacture there may be a potential cross-linking combination formed but actual cross-linking may not take place until the subsequent stage is reached, i. e., heat and vacuum stage, or oxyalkylation stage. This situation may be related or explained in terms of a theory of flaws, or Lockerstellen, which is employed in explaining flaw-forming groups due to the fact that a $CH_2OH$ radical and H atom may not lie in the same plane in the manufacture of ordinary phenol-aldehyde resins.

Secondly, the formation or absence of formation of insolubles may be related to the aldehyde used and the ratio of aldehyde, particularly formaldehyde, insofar that a slight variation may, under circumstances not understandable, produce insolubilization. The formation of the insoluble resin is apparently very sensitive to the quantity of formaldehyde employed and a slight increase in the proportion of formaldehyde may lead to the formation of insoluble gel lumps. The cause of insoluble resin formation is not clear, and nothing is known as to the structure of these resins.

All that has been said previously herein as regards resinification has avoided the specific reference to activity of a methylene hydrogen atom. Actually there is a possibility that under some drastic conditions cross-linking may take place through formaldehyde addition to the methylene bridge, or some other reaction involving a methylene hydrogen atom.

Finally, there is some evidence that, although the meta positions are not ordinarily reactive, possibly at times methylol groups or the like are formed at the meta positions; and if this were the case it may be a suitable explanation of abnormal cross-linking.

Reactivity of a resin towards excess aldehyde, for instance formaldehyde, is not to be taken as a criterion of rejection for use as a reactant. In other words, a phenol-aldehyde resin which is thermoplastic and solvent-soluble, particularly if xylene-soluble, is perfectly satisfactory even though retreatment with more aldehyde may change its characteristics markedly in regard to both fusibility and solubility. Stated another way, as far as resins obtained from difunctional phenols are concerned, they may be either formaldehyde-resistant or not formaldehyde-resistant.

Referring again to the resins herein contemplated as reactants, it is to be noted that they are thermoplastic phenol-aldehyde resins derived from difunctional phenols and are clearly distinguished from Novolaks or resoles. When these resins are produced from difunctional phenols and some of the higher aliphatic aldehydes, such as acetaldehyde, the resultant is often a comparatively soft or pitchlike resin at ordinary temperature. Such resins become comparatively fluid at 110° to 165° C. as a rule and thus can be readily oxyalkylated, preferably oxyethylated, without the use of a solvent.

Reference has been made to the use of the word "fusible." Ordinarily a thermoplastic resin is identified as one which can be heated repeatedly and still not lose its thermoplasticity. It is recognized, however, that one may have a resin which is initially thermoplastic but on repeated heating may become insoluble in an organic solvent, or at least no longer thermoplastic, due to the fact that certain changes take place very slowly. As far as the present invention is concerned, it is obvious that a resin to be suitable need only be sufficiently fusible to permit processing to produce our oxyalkylated products and not yield insolubles or cause insolubilization or gel formation, or rubberiness, as previously described. Thus resins which are, strictly speaking, fusible but not necessarily thermoplastic in the most rigid sense that such terminology would be applied to the mechanical properties of a resin, are useful intermediates. The bulk of all fusible resins of the kind herein described are thermoplastic.

The fusible or thermoplastic resins, or solvent-soluble resins, herein employed as reactants, are water-insoluble, or have no appreciable hydrophile properties. The hydrophile property is introduced by oxyalkylation. In the hereto appended claims and elsewhere the expression "water-insoluble" is used to point out this characteristic of the resins used.

In the manufacture of compounds herein employed, particularly for demulsification, it is obvious that the resins can be obtained by one of a number of procedures. In the first place, suitable resins are marketed by a number of companies and can be purchased in the open market; in the second place, there are a wealth of examples of suitable resins described in the literature. The third procedure is to follow the directions of the present application.

The following examples, 1a to 20a, give specific directions for preparing oxyalkylation-susceptible, water-insoluble, organic solvent-soluble, fusible, phenolic resins which may be used to prepare the products used in the practice of the invention. Additionally, we direct attention to Examples 1a to 206a of our application Serial No. 8,722, filed on the same day this application was filed, as illustrating suitable resins for this purpose. Examples 1b to 10b illustrate carrying out the oxyalkylation procedure to produce products useful in the practice of the invention. Again we direct attention to Examples 1b to 16b and 20b to 25b of our application Serial No. 8,722 as illustrating products useful for the practice of this invention. Examples 1c to 3c illustrate the use of the products for demulsification.

*Example 1a*

|  | Grams |
|---|---|
| Para-tertiary butylphenol (1.0 mole) | 150 |
| Formaldehyde 37% (1.1 mole) | 81 |
| Concentrated HCl | 1.5 |
| Monoalkyl ($C_{10}$–$C_{20}$, principally $C_{12}$–$C_{14}$) benzene monosulfonic acid sodium salt | 0.8 |
| Xylene | 100 |

(Examples of alkylaryl sulfonic acids which serves as catalysts and as emulsifiers particularly in the form of sodium salts include the following:

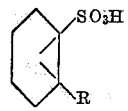

R is an alkyl hydrocarbon radical having 12–14 carbon atoms.

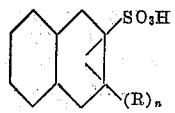

R is an alkyl radical having 3–12 carbon atoms and n represents the numeral 3, 2, or 1, usually 2, in such instances where R contains less than 8 carbon atoms.

With respect to alkylaryl sulfonic acids or the sodium salts, we have employed a monoalkylated benzene monosulfonic acid or the sodium salt thereof wherein the alkyl group contains 10 to 14 carbon atoms. We have found equally effective and interchangeable the following specific sulfonic acids or their sodium salts: A mixture of di- and tripropylated naphthalene monosulfonic acid; diamylated naphthalene monosulfonic acid; and nonyl naphthalene monosulfonic acid.)

The equipment used was a conventional two-piece laboratory resin pot. The cover part of the equipment had four openings: One for reflux condenser; one for the stirring device; one for a separatory funnel or other means of adding reactants; and a thermometer well. In the manipulation employed, the separatory funnel insert for adding reactants was not used. The device was equipped with a combination reflux and water-trap apparatus so that the single piece of apparatus could be used as either a reflux condenser or a water trap, depending on the position of the three-way glass stopcock. This permitted convenient withdrawal of water from the water trap. The equipment, furthermore, permitted any setting of the valve without disconnecting the equipment. The resin pot was heated with a glass fiber electrical heater constructed to fit snugly around the resin pot. Such heaters, with regulators, are readily available.

The phenol, formaldehyde, acid catalyst, and solvent were combined in the resin pot above described. This particular phenol was in the form of a flaked solid. Heat was applied with gentle stirring and the temperature was raised to 80–85° C., at which point a mild exothermic reaction took place. This reaction raised the temperature to approximately 105–110° C. The reaction mixture was then permitted to reflux at 100–105° C. for between one and one and one-half hours. The reflux trap arrangement was then changed from the reflux position to the normal water entrapment position. The water of solution and the water of reaction were permitted to distill out and collect in the trap. As the water distilled out, the temperature gradually increased to approximately 150° C. which required between 1.5 to 2 hours. At this point the water recovered in the trap, after making allowance for a small amount of water held up in the solvent, corresponded to the expected quantity.

The solvent solution so obtained was used as such in subsequent oxyalkylation steps. We have also removed the solvent by conventional means, such as evaporation, distillation or vacuum distillation, and we customarily take a small sample of the solvent solution and evaporate the solvent to note the characteristics of the solvent-free resin. The resin obtained in the operation above described was clear, light amber colored, hard, brittle, and had a melting point of 160–165° C.

Attention is directed to the fact that tertiary butylphenol, in presence of a strong mineral acid as a catalyst and using formaldehyde, sometimes yields a resin which apparently has a very slight amount of cross-linking. Such resin is similar to the one described above except that it is somewhat opaque, and its melting point is higher than the one described above and there is a tendency to cure. Such a resin is generally dispersible in xylene but not soluble to give a clear solution. Such dispersion can be oxyalkylated in the same manner as the clear resin. If desired, a minor proportion of another and inert solvent, such as diethyleneglycol diethylether, may be employed along with xylene, to give a clear solution prior to oxyalkylation. This fact of solubilization shows the present resin molecules are still quite small, as contrasted with the very large size of extensively cross-linked resin molecules. If following a given procedure with a given lot of the phenol, such a resin is obtained, the amount of catalyst employed is advantageously reduced slightly or the time of reflux reduced slightly, or both, or an acid such as oxalic acid is used instead of hydrochloric acid. Purely as a matter of convenience due to better solubility in xylene, we prefer to use a clear resin but if desired either type may be employed.

*Example 2a*

The same procedure was followed as in Example 1a preceding, and the materials used the same, except that the para-tertiary butylphenol was replaced by an equal amount of para-secondary butylphenol. The phenol was a solid of a somewhat mushy appearance, resembling moist cornmeal rather than dry flakes. The appearance of the resin was substantially identical with that described in Example 1a, preceding. The solvent-free resin was reddish-amber in color, somewhat opaque but completely xylene-soluble. It was semi-soft or pliable in consistency. See what is said in Example 1a, preceding, in regard to the opaque appearance of the resin. What is said there applies with equal force and effect in the instant example.

*Example 3a*

| | Grams |
|---|---|
| Para-tertiary amylphenol (1.0 mole) | 164 |
| Formaldehyde 37% (1.0 mole) | 81 |
| HCl (concentrated) | 1.5 |
| Monoalkyl ($C_{10}$-$C_{20}$, principally $C_{12}$-$C_{14}$) benzene monosulfonic acid sodium salt | 0.8 |
| Xylene | 100 |

The procedure followed was the same as that used in Example 1a, preceding. The phenol employed was a flaked solid. The solvent-free resin was dark red in color, hard, brittle, with a melting point of 128-140° C. It was xylene-soluble.

*Example 4a*

The same procedure was employed as in Example 1a, preceding, using 198 grams of commercial styrylphenol and 150 grams of xylene. Styrylphenol is a white solid. The resin was reddish black in color, hard and brittle, with a melting point of about 80° to 85° C.

*Example 5a*

| | Grams |
|---|---|
| Para-tertiary amylphenol (1.0 mole) | 164 |
| Formaldehyde 37% (0.8 mole) | 64.8 |
| Glyoxal 30% (0.1 mole) | 20.0 |
| Concentrated HCl | 2 |
| Monoalkyl ($C_{10}$-$C_{20}$, principally $C_{12}$-$C_{14}$) benzene monosulfonic acid sodium salt | .75 |
| Xylene | 150 |

This resin was prepared using the same equipment, and the same procedure as in Example 1a, preceding. The resin contained a slight amount of insoluble material which was removed by filtration of the xylene solution. This slight amount of insoluble material may have been the result of some very minor decomposition, due to the fact that the glyoxal was an aged sample. After removal of the small amount of insoluble material, the xylene was removed by distillation. The resultant resin was reddish amber in color, soft or liquid in consistency and xylene-soluble.

*Example 6a*

| | Grams |
|---|---|
| Para-tertiary butylphenol (1.0 mole) | 150 |
| Acetaldehyde | 44 |
| Concentrated $H_2SO_4$ | 2 |
| Xylene | 100 |

The phenol, acid catalyst, and 50 grams of the xylene were combined in the resin pot previously described under Example 1a. The initial mixture did not include the aldehyde. The mixture was heated with stirring to approximately 150° C. and permitted to reflux.

The remainder of the xylene, 50 grams, was then mixed with the acetaldehyde; and this mixture was added slowly to the materials in the resin pot, with constant stirring, by means of the separatory funnel arrangement previously mentioned in the description of the resin pot in Example 1a. Approximately 30 minutes were required to add this amount of diluted aldehyde. A mild exothermic reaction was noted at the first addition of the aldehyde. The temperature slowly dropped, as water of reaction formed, to about 100° to 110° C., with the reflux temperature being determined by the boiling point of water. After all the aldehyde had been added, the reactants were permitted to reflux for between an hour to an hour and a half before removing the water by means of the trap arrangement. After the water was removed the remainder of the procedure was essentially the same as in Example 1a. When a sample of the resin was freed from the solvent, it was dark red, semi-hard or pliable in consistency, and xylene-soluble.

*Example 7a*

| | Grams |
|---|---|
| Para-tertiary amylphenol | 164 |
| Furfural | 96 |
| Potassium carbonate | 8 |

The furfural was shaken with dry sodium carbonate prior to use, to eliminate any acids, etc. The procedure employed was substantially that described in detail in Technical Bulletin No. 109 of the Quaker Oats Company, Chicago, Illinois. The above reactants were heated under the reflux condenser for two hours in the same resin pot arrangement described in Example 1a. The separatory funnel device was not employed. No xylene or other solvent was added. The amount of material vaporized and condensed was comparatively small except for the water of reaction. At the end of this heating or reflux period, the trap was set to remove the water. The maximum temperature during and after removal of water was approximately 202° C. The material in the trap represented 16 cc. water and 1.5 cc. furfural. The resin was a bright black, hard resin, xylene-soluble, and had a melting point of 130° to 135° C., with some tendency towards being slowly curable. We have also successfully followed this same procedure using 3.2 grams of potassium carbonate instead of 8.0 grams.

*Example 8a*

| | Grams |
|---|---|
| Para-tertiary amylphenol | 492 |
| Formaldehyde, 37% | 528 |
| NaOH in 30 cc. $H_2O$ | 6.8 |
| Monoalkyl ($C_{10}$-$C_{20}$, principally $C_{12}$-$C_{14}$) benzene monosulfonic acid sodium salt | 2.0 |
| Xylene | 200 |

The above reactants were combined in a resin pot similar to that previously described, equipped with stirrer and reflux condenser. The reactants were heated with stirring under reflux for 2 hours at 100° to 110° C. The resinous mixture was then permitted to cool sufficiently to permit the addition of 15 ml. of glacial acetic acid in 150 cc. $H_2O$. On standing, a separation was effected, and the aqueous lower layer drawn off. The upper resinous solution was then washed with 300 ml. of water to remove any excess HCHO, sodium acetate, or acetic acid. The xylene was then removed from the resinous solution by distilling under vacuum to 150° C. The resulting resin was clear, light amber in color, and semi-fluid or tacky in consistency.

*Example 9a*

Resin of Example 8a was subjected to vacuum distillation to 225° C., at 25 mm. Hg. The resulting product was a hard, brittle resin, xylene-soluble, and having a melting point of 145-150° C.

*Example 10a*

| | Grams |
|---|---|
| Commercial para-tertiary amylphenol | 328 |
| Formaldehyde (37%) | 352 |
| NaOH in 20 cc. $H_2O$ | 4.5 |
| Monoalkyl ($C_{10}$-$C_{20}$, principally $C_{12}$-$C_{14}$) benzene monosulfonic acid sodium salt | 1.5 |

The above reactants were refluxed with stirring for 2 hours. 200 grams of xylene were then added and the whole cooled to 90–100° C., and the NaOH neutralized with 10 cc. glacial acetic acid in 100 cc. H₂O. The mass was allowed to stand, effecting a separation. The lower aqueous layer was withdrawn and the upper resinous solution was washed with water. After drawing off the wash water, the xylene solution was subjected to vacuum distillation, heating to 150° C. The resulting solvent-free resin was xylene-soluble, soft or tacky in consistency, and pale yellow or light amber in color.

On heating further, without vacuum distillation, the following physical changes were noted:

Heated to 160° C.—Soft, tacky, pale yellow
Heated to 190° C.—Hard, fairly brittle, pale yellow—low melting point
Heated to 200° C.—Hard, fairly brittle, pale yellow—105–115° C. melting point
Heated to 225° C.—Hard, brittle, amber—120–125° C. melting point
Heated to 250° C.—Hard, brittle, dark amber—128–135° C. melting point
Heated to 275° C.—Very brittle, deep brown—155–160° C. melting point The above distillation was without the use of vacuum. It illustrates that heating alone, or heating with vacuum, changes a low-stage resin into a medium or high-stage resin.

Example 11a

| | Grams |
|---|---|
| Menthylphenol (3.0 moles) | 696 |
| Heptaldehyde (3.0 moles) | 343 |
| Concentrated H₂SO₄ | 6 |
| Xylene | 500 |

The procedure employed was essentially the same as in Example 6a where acetaldehyde was employed, but with the difference that due to the fact that heptaldehyde is a higher boiling aldehyde, it was not necessary to dilute it with the xylene. For this reason all the xylene was added to the initial mixture, and the heptaldehyde was added by means of the separatory funnel arrangement. Thus, the phenol, acid catalyst, and solvent were combined in a resin pot by the same procedure used in Example 6a. The resin, after removal of the solvent by distillation, was clear, dark red in color, had a soft, tacky appearance and was xylene-soluble.

Example 12a

| | Grams |
|---|---|
| Nonylphenol (31 moles) | 6820 |
| Formaldehyde 37% (42 moles) | 3430 |
| NaOH (in 200 c.c. H₂O) | 93 |
| Xylene | 2040 |

The above reactants were combined in a 5-gallon autoclave and heated with stirring in the following manner:

| Time | Temperature | Pounds per Square Inch |
|---|---|---|
| | °C. | |
| 10:30 a. m. | 25 | 0 |
| 11:00 a. m. | 100 | 15 |
| 11:30 a. m. | 127 | 40 |
| 12:00 Noon | 148 | 60 |
| 1:00 p. m. | 177 | 130 |
| 1:30 p. m. | 185 | 160 |
| 2:00 p. m. | 194 | 185 |

The reaction was stopped at this point, sufficient cooling water was applied to lower the temperature to approximately 80° C., or cool enough to permit opening the autoclave and adding 202 grams of glacial acetic acid to neutralize the NaOH.

The product was then removed from the autoclave and the resin solution diluted further so as to effect a ready separation of the aqueous layer. After twice washing with water to remove the excess formaldehyde, acetic acid and formed salt, the resin was subjected to vacuum distillation to 149° C. at 25 mm. Hg vacuum. The resulting resin was reddish black in color, xylene-soluble, hard but not brittle, and had a melting point of 85° to 90° C.

Example 13a

| | Grams |
|---|---|
| Butyl salicylate (2.0 moles) | 388 |
| Formaldehyde 37% (2.3 moles) | 182 |
| Concentrated HCl | 20 |
| Monoalkyl (C₁₀–C₂₀, principally C₁₂–C₁₄) benzene monosulfonic acid sodium salt | 2.5 |
| Xylene | 200 |

The same procedure was followed as in Example 1a. The resin was soft, and amber in color.

Example 14a

| | Grams |
|---|---|
| Amyl salicylate (2.0 moles) | 416 |
| Formaldehyde 37% (2.3 moles) | 182 |
| Concentrated HCl | 20 |
| Monoalkyl (C₁₀–C₂₀, principally C₁₂–C₁₄) benzene monosulfonic acid sodium salt | 2.5 |
| Xylene | 200 |

The same procedure was followed in Example 1a. The resin was soft and amber in color.

Example 15a

| | Grams |
|---|---|
| Octyl salicylate (2.0 moles) | 500 |
| Formaldehyde 37% (2.3 moles) | 182 |
| Concentrated HCl | 25 |
| Monoalkyl (C₁₀–C₂₀, principally C₁₂–C₁₄) benzene monosulfonic acid sodium salt | 3.0 |
| Xylene | 250 |

The same procedure was followed as in Example 1a. The resin was soft, and amber in color.

Example 16a

| | Grams |
|---|---|
| Para-hydroxy ethylbenzoate | 156 |
| Formalin (formaldehyde 37%) | 88 |
| Oxalic acid (dissolved in 1 part water) | 1.6 |

The reaction time and conditions were the same as in Example 1a, except no alkylaryl sulfonate was added. The reacted components were dehydrated by heating at atmospheric pressure between 100° and 150° C. until a hard non-tacky resin was obtained.

On heating further to a temperature of 250° C. without vacuum and removing a small amount of additional water, there was obtained an almost transparent, very light amber colored resin, which was not only hard but also brittle.

Example 17a

| | Grams |
|---|---|
| Salicylic acid (2.0 moles) | 276 |
| HCHO 37% (2.0 moles) | 162 |
| Water | 600 |
| Xylene | 100 |

The same procedure was followed as in Example 1a preceding, except that the reflux period was 8 hours. At the end of this time there was still a strong odor of formaldehyde present in the vapors and there was present in the flask unreacted salicylic acid. For this reason another mole of formaldehyde was added (81 more grams) and the resinification period repeated for another 3 hours. At the end of this time the water was distilled off along with the unreacted formaldehyde.

The value of salicylic acid as a resin-making compound for the production of compounds for use in the present invention rests not so much in the use of the product as such, as in its use in admixture with other phenolic reactants. Thus, if one makes a mixture of approximately 4 moles of para-amylphenol, for example, and one mole of salicylic acid and resinifies the mixture, there are two advantages; (1) the mixture is soluble, or at least it can be handled in xylene much more advantageously than resins from salicylic acid alone, and (2) one obtains a resin which has certain possibilities for further reaction which are not present in the usual hydrocarbon substituted phenol resin. A resin molecule is obtained which may be indicated in its simplest aspect in the following manner.

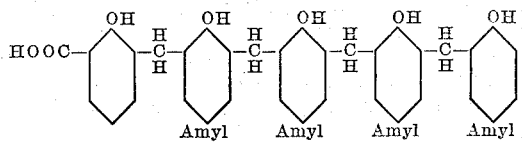

The above formula is, of course, an idealized structure for obvious reasons because the salicylic acid nucleus presumably can appear at any point in the resin molecule. Such resin, or for that matter a resin having an increased number of salicylic acid radicals, can be oxyalkylated in the same manner as other phenol-aldehyde resins.

The reactive carboxyl radical permits a number of variations. Thus, the resin can be reacted with reagents such as ethylene glycol, glycerol, triethanolamine, diethanolamine, etc.

*Example 18a*

| | Grams |
|---|---|
| Salicylic acid (0.5 mole) | 69 |
| Para-tertiaryamylphenol (2.0 moles) | 328 |
| Monoalkyl ($C_{10}$–$C_{20}$, principally $C_{12}$–$C_{14}$) benzene monosulphonic acid sodium salt | 1.5 |
| Concentrated HCl | 20 |
| Xylene | 400 |
| Formaldehyde 37% | 208 |

The same procedure was followed as in Example 1a, except that the amount of hydrochloric acid employed is comparatively high, to wit, 20 grams, and the reflux time, instead of being 1½ hours is 3 hours. Only a very small amount of salicylic acid was lost on evaporation. The resin is soft and tacky, and xylene-soluble.

*Example 19a*

The same procedure was followed as in the preceding example, through the point where all the water had been removed, leaving the anhydrous resin in the solution of xylene. The temperature at this point was about 145° C. Eighty-five grams of triethanolamine, commercial grade (about 5/10 mole) were then added. More xylene was then allowed to distill out until the temperature rose to 180° to 185° C. The mass was then allowed to reflux at this temperature for approximately three hours with the usual trap arrangement. During this period substantially all the water of esterification was eliminated, the amount of water being approximately 10 cubic centimeters.

When all the water had been eliminated the xylene which distilled out earlier between the range of 145° to 185° C., was again added to the mixture so as to give a uniform solution containing about 60 parts of resin and 40 parts of xylene.

The cheapest salicylate is methylsalicylate. A resin can be prepared from methylsalicylate alone or methylsalicylate in combination with para-amylphenol, para-butylphenol, or any one of a number of other phenols as described, and then the resin can be subjected to alcoholysis in presence of an alkali so as to replace the methyl radical by some higher alkyl radical. This is illustrated by alcoholysis with hexyl alcohol, octyl alcohol, decyl alcohol, benzyl alcohol, cyclohexyl alcohol, oleyl alcohol, styryl alcohol, ethyeneglycol, diethylene glycol, phenoxyethanol, etc. The salicylic acid ester of the corresponding alcohol is also useful as an initial raw material, instead of methyl salicylate.

The carboxy radical of salicylic acid remaining in a salicylic acid resin, such as those illustrated above may be reacted, not only with ethyleneglycol and triethanolamine as illustrated but with other conventional reactants such as ammonia, primary amines such as amylamine, secondary amines such as diamylamine, ethyl ethanolamine, diethanolamine, butyl ethanolamine, and propanolamines, hexanolamines, butanolamines, pentanolamines, and cyclohexylamines and a variety of other suitable compounds in which the final effect is simply that of an acylation reaction.

*Example 20a*

| | Grams |
|---|---|
| Para-chlorophenol (1.0 mole) | 128.5 |
| Formaldehyde 37% (1.33 mole) | 109 |
| Concentrated HCl | 3 |
| Monoalkyl ($C_{10}$-$C_{20}$, principally $C_{12}$-$C_{14}$) benzene monosulfonic acid sodium salt | .2 |
| Xylene | 150 |

The same procedure was followed as described in Example 1a. The resulting resin was dark in color and hard and brittle in consistency.

Other phenols of the kind previously mentioned include dimethylaminomethylphenol. This is a mixture of

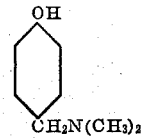

and

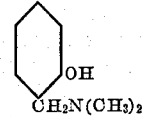

As in the case of salicylic acid the most desirable products are those in which dimethylaminomethylphenol contributes a portion of the phenolic reactants.

The preceding examples illustrate some of the intermediate reactions, such as reaction with triethanolamine, ethyleneglycol, etc., useful with resins in which the phenol is substituted by a group having a reactive hydrogen. We have also reacted such products with chlorohydrin and subsequently with a tertiary amine and obtained useful products. We have made a number of such mixed resins using a variety of difunctional phenols other than para-tertiaryamylphenol; for instance, we have employed para-secondaryamylphenol, para-tertiarybutylphenol, para-secondarybutylphenol, para-octylphenol, para-nonylphenol, etc. We have then subjected the resins to intermediate steps of the kind described in Example 19a and then subjected the products of reaction to oxyalkylation, such as oxyethylation, and obtained compounds which are of outstanding effectiveness for demulsification of petroleum emulsions.

Attention is directed to a statement which appeared earlier in the instant section to the effect that when a substituent in a difunctional phenol was other than a hydrocarbon radical it might resemble either a cresol or an amylphenol when examined from the standpoint of the ultimate oxyalkylated compound, particularly as a demulsifier. Thus, chlorophenols give compounds of effectiveness, as demulsifiers comparable to that of compounds derived from ortho or para-cresol. On the other hand propylsalicylate, butylsalicylate, octylsalicylate, and the like yield compounds comparable in effectiveness to those derived from butylphenol.

In a number of the foregoing examples, phenols have been identified without specific designation of the position of substitution or the structure of the substituent radical. In such cases, the phenols meant are either the commercial products distributed under these names, or, if the products are not commercially available, the products obtained by customary syntheses from phenol, meta-cresol or 3,5-xylenol, and consist mainly of the para- substituted product, usually associated with some of the ortho- substituted product, perhaps a very small proportion of meta- substituted material, some impurities, etc. Also, it is to be understood that all of the products of the foregoing examples, unless it is otherwise stated in the example, are soluble in xylene, at least to an extent sufficient to permit the use of xylene as the solvent in oxyalkylation.

As far as the manufacture of resins is concerned it is usually most convenient to employ a catalyst such as illustrated by previous examples.

It is extremely difficult to depict the structure of a resin derived from a single phenol. When mixtures of phenols are used, even in equimolar proportions, the structure of the resin is even more indeterminable. In other words, a mixture involving para-butylphenol and para-amylphenol might have an alternation of the two nuclei or one might have a series of butylated nuclei and then a series of amylated nuclei. If a mixture of aldehydes is employed, for instance, acetaldehyde and butyraldehyde, or acetaldehyde and formaldehyde, or benzaldehyde and acetaldehyde, the final structure of the resin becomes even more complicated and possibly depends on the relative reactivity of the aldehydes. For that matter, one might be producing simultaneously two different resins, in what would actually be a mechanical mixture, although such mixture might exhibit some unique properties as compared with a mixture of the same two resins prepared separately. Similarly, as has been suggested, one might use a combination of oxyalkylating agents; for instance, one might partially oxyalkylate with ethylene oxide and then finish off with propylene oxide. It is understood that the use of oxyalkylated derivatives of such resins, derived from such plurality of reactants instead of being limited to a single reactant from each of the three classes, is contemplated and here included for the reason that they are obvious variants.

Having obtained a suitable resin of the kind described, such resin is subjected to treatment with a low molal reactive alpha-beta olefin oxide so as to render the product distinctly hydrophile in nature as indicated by the fact that it becomes self-emulsifiable or miscible or soluble in water, or self-dispersible, or has emulsifying properties. If the phenol substituent has a reactive hydrogen atom, as in salicylic acid resins, two procedures are available, and both give useful products. In the first, the reactive position is blocked, as by esterification, or amidification, and the phenolic hydroxyls then oxyalkylated. In the second, the reactive position is oxyalkylated along with the phenolic hydroxyls.

The olefin oxides employed for oxyalkylation are characterized by the fact that they contain not over 4 carbon atoms and are selected from the class consisting of ethylene oxide, propylene oxide, butylene oxide, glycide, and methylglycide. Glycide may be, of course, considered as a hydroxy propylene oxide and methyl glycide as a hydroxy butylene oxide. In any event, however, all such reactants contain the reactive ethylene oxide ring and may be best considered as derivatives of or substituted ethylene oxides. The solubilizing effect of the oxide is directly proportional to the percentage of oxygen present, or specifically, to the oxygen-carbon ratio.

In ethylene oxide, the oxygen-carbon ratio is 1:2. In glycide, it is 2:3; and in methyl glycide, 1:2. In such compounds, the ratio is very favorable to the production of hydrophile or surface-active porperties. However, the ratio, in propylene oxide, is 1:3, and in butylene oxide, 1:4. Obviously, such latter two reactants are satisfactorily employed only where the resin composition is such as to make incorporation of the desired property practical. In other cases, they may produce marginally satisfactory derivatives, or even unsatisfactory derivatives. They are usable in conjunction with the three more favorable alkylene oxides in all cases. For instance, after one or several propylene oxide or butylene oxide molecules have been attached to the resin molecule, oxyalkylation may be satisfactorily continued using the more favorable members of the class, to produce the desired hydrophile product. Used alone, these two reagents may in some cases fail to product sufficiently hydrophile derivatives because of their relatively low oxygen-carbon ratios.

Thus, ethylene oxide is much more effective than propylene oxide, and propylene oxide is more effective than butylene oxide. Hydroxy propylene oxide (glycide) is more effective than propylene oxide. Similarly, hydroxy butylene oxide (methyl glycide) is more effective than butylene oxide. Since ethylene oxide is the cheapest alkylene oxide available and is reactive, its use is definitely advantageous, and espectially in light of its high oxygen content. Propylene oxide is less reactive than ethylene oxide, and butylene oxide is definitely less reactive than propylene oxide. On the other hand, glycide may react with almost explosive violence and must be handled with extreme care.

The oxyalkylation of resins of the kind from which the products used in the practice of the present invention are prepared is advantageously catalyzed by the presence of an alkali. Useful alkaline catalysts include soaps, sodium acetate, sodium hydroxide, sodium methylate, caustic potash, etc. The amount of alkaline catalyst usually is between 0.2% to 2%. The temperature employed may vary from room temperature to as high as 200° C. The reaction may be conducted with or without pressure, i. e., from zero pressure to approximately 200 or even 300 pounds gauge pressure (pounds per square inch). In a general way, the method employed is substantially the same procedure as used for oxyalkylation of other organic materials having reactive phenolic groups.

It may be necessary to allow for the acidity of a resin in determining the amount of alkaline catalyst to be added in oxyalkylation. For instance, if a nonvolatile strong acid such as sulfuric acid is used to catalyze the resinification reaction, presumably after being converted into a sulfonic acid, it may be necessary and is usually advantageous to add an amount of alkali equal stoichiometrically to such acidity, and include added alkali over and above this amount as the alkaline catalyst.

It is advantageous to conduct the oxyethylation in presence of an inert solvent such as xylene, cymene, decalin, ethylene glycol diethylether, diethyleneglycol diethylether, or the like, although with many resins, the oxyalkylation proceeds satisfactorily without a solvent. Since xylene is cheap and may be permitted to be present in the final product used as a demulsifier, it is our preference to use xylene. This is particularly true in the manufacture of products from low-stage resins, i. e., of 3 and up to and including 7 units per molecule.

If a xylene solution is used in an autoclave as hereinafter indicated, the pressure readings of course represent total pressure, that is, the combined pressure due to xylene and also due to ethylene oxide or whatever other oxyalkylating agent is used. Under such circumstances it may be necessary at times to use substantial pressures to obtain effective results, for instance, pressures up to 300 pounds along with correspondingly high temperatures, if required.

However, even in the instance of high-melting resins, a solvent such as xylene can be eliminated in either one of two ways: After the introduction of approximately 2 or 3 moles of ethylene oxide, for example, per phenolic nucleus, there is a definite drop in the hardness and melting point of the resin. At this stage, if xylene or a similar solvent has been added, it can be eliminated by distillation (vacuum distillation if desired) and the subsequent intermediate, being comparatively soft and solvent-free, can be reacted further in the usual manner with ethylene oxide or some other suitable reactant.

Another procedure is to continue the reaction to completion with such solvent present and then eliminate the solvent by distillation in the customary manner.

Another suitable procedure is to use propylene oxide or butylene oxide as a solvent as well as a reactant in the earlier stages along with ethylene oxide, for instance, by dissolving the powdered resin in propylene oxide even though oxyalkylation is taking place to a greater or lesser degree. After a solution has been obtained which represents the original resin dissolved in propylene oxide or butylene oxide, or a mixture which includes the oxyalkylated product, ethylene oxide is added to react with the liquid mass until hydrophile properties are obtained. Since ethylene oxide is more reactive than propylene oxide or butylene oxide, the final product may contain some unreacted propylene oxide or butylene oxide which can be eliminated by volatilization or distillation in any suitable manner.

Attention is directed to the fact that the resins herein described must be fusible or soluble in an organic solvent. Fusible resins invariably are soluble in one or more organic solvents such as those mentioned elsewhere herein. It is to be emphasized, however, that the organic solvent employed to indicate or assure that the resin meets this requirement need not be the one used in oxyalkylation. Indeed solvents which are susceptible to oxyalkylation are included in this group of organic solvents. Examples of such solvents are alcohols and alcohol-ethers. However, where a resin is soluble in an organic solvent, there are usually available other organic solvents which are not susceptible to oxyalkylation, useful for the oxyalkylation step. In any event, the organic solvent-soluble resin can be finely powdered, for instance to 100 to 200 mesh, and a slurry or suspension prepared in xylene or the like, and subjected to oxyalkylation. The fact that the resin is soluble in an organic solvent or the fact that it is fusible means that it consists of separate molecules. Phenol-aldehyde resins of the type herein specified possess reactive hydroxyl groups and are oxyalkylation susceptible.

Considerable of what is said immediately hereinafter is concerned with the ability to vary the hydrophile properties of the compounds used in the process from minimum hydrophile properties to maximum hydrophile properties. Even more remarkable, and equally difficult to explain, are the versatility and utility of these compounds as one goes from minimum hydrophile property to ultimate maximum hydrophile property. For instance, minimum hydrophile property may be described roughly as the point where two ethyleneoxy radicals or moderately in excess thereof are introduced per phenolic hydroxyl. Such minimum hydrophile property or sub-surface-activity or minimum surface-activity means that the product shows at least emulsifying properties or self-dispersion in cold or even in warm distilled water (15° to 40° C.) in concentrations of 0.5% to 5.0%. These materials are generally more soluble in cold water than warm water, and may even be very insoluble in boiling water. Moderately high temperatures aid in reducing the viscosity of the solute under examination. Sometimes if one continues to shake a hot solution, even though cloudy or containing an insoluble phase, one finds that solution takes place to give a homogeneous phase as the mixture cools. Such self-dispersion tests are conducted in the absence of an insoluble solvent.

When the hydrophile-hydrophobe balance is above the indicated minimum (2 moles of ethylene oxide per phenolic nucleus or the equivalent) but insufficient to give a sol as described immediately preceding, then, and in that event hydrophile properties are indicated by the fact that one can produce an emulsion by having present 10% to 50% of an inert solvent such as xylene. All that one need to do is to have a xylene solution within the range of 50 to 90 parts by weight of oxyalkylated derivatives and 50 to 10 parts by weight of xylene and mix such solution with one, two or three times its volume of distilled water and shake vigorously so as to obtain an emulsion which may be of the oil-in-water type or the water-in-oil type (usually the former) but, in any event, is due to the hydrophile-hydrophobe balance of the oxyalkylated derivative. We prefer simply to use the xylene diluted derivatives, which are described elsewhere, for this test rather than evaporate the solvent and employ any more elaborate tests, if the solubility is not sufficient to permit the simple sol test in water previously noted.

If the product is not readily water soluble it may be dissolved in ethyl or methyl alcohol, ethylene glycol diethylether, or diethylene glycol diethylether, with a little acetone added if required, making a rather concentrated solution, for instance 40% to 50%, and then adding enough of the concentrated alcoholic or equivalent solution to give the previously suggested 0.5% to 5.0% strength solution. If the product is self-dispersing (i. e., if the oxyalkylated product is a liquid or a liquid solution self-emulsifiable), such sol or dispersion is referred to as at least semi-stable in the sense that sols, emulsions, or dispersions prepared are relatively stable, if they remain at least for some period of time, for instance 30 minutes to two hours, before showing any marked separation. Such tests are conducted at room temperature (22° C.). Needless to say, a test can be made in presence of an insoluble solvent such as 5% to 15% of xylene, as noted in previous examples. If such mixture, i. e., containing a water-insoluble solvent, is at least semi-stable, obviously the solvent-free product would be even more so. Surface-activity representing an advanced hydrophile-hydrophobe balance can also be determined by the use of conventional measurements hereinafter described. One outstanding characteristic property indicating surface-activity in a material is the ability to form a permanent foam in dilute aqueous solution, for example, less than 0.5%, when in the higher oxyalkylated stage; and to form an emulsion in the lower and intermediate stages of oxyalkylation.

Allowance must be made for the presence of a solvent in the final product in relation to the hydrophile properties of the final product. The principle involved in the manufacture of the herein contemplated compounds for use as demulsifying agents, is based on the conversion of a hydrophobe or non-hydrophile compound or mixture of compounds into products which are distinctly hydrophile, at least to the extent that they have emulsifying properties or are self-emulsifying; that is, when shaken with water they produce stable or semi-stable suspensions; or, in the presence of a water-insoluble solvent, such as xylene, an emulsion. In demulsification, it is sometimes preferable to use a product having markedly enhanced hydrophile properties over and above the initial stage of self-emulsifiability, although we have found that with products of the type used herein, most efficacious results are obtained with products which do not have hydrophile properties beyond the stage of self-dispersibility.

More highly oxyalkylated resins give colloidal solutions or sols which show typical properties comparable to ordinary surface-active agents. Such conventional surface-activity may be measured by determining the surface tension and the interfacial tension against paraffin oil or the like. At the initial and lower stages of oxyalkylation, surface-activity is not suitably determined in this same manner but one may employ an emulsification test. Emulsions come into existence as a rule through the presence of a surface-active emulsifying agent. Some surface-active emulsifying agents such as mahogany soap may produce a water-in-oil emulsion or an oil-in-water emulsion depending upon the ratio of the two phases, degree of agitation, concentration of emulsifying agent, etc.

The same is true in regard to the oxyalkylated resins herein specified, particularly in the lower stage of oxyalkylation, the so-called "sub-surface-active" stage. The surface-active properties are readily demonstrated by producing a xylene-water emulsion. A suitable procedure is as follows: The oxyalkylated resin is dissolved in an equal weight of xylene. Such 50-50 solution is then mixed with 1-3 volumes of water and shaken to produce an emulsion. The amount of xylene is invariably sufficient to reduce even a tacky resinous product to a solution which is readily dispersible. The emulsions so produced are usually xylene-in-water emulsions (oil-in-water type) particularly when the amount of distilled water used is at least slightly in excess of the volume of xylene solution and also if shaken vigorously. At times, particularly in the lowest stage of oxyalkylation, one may obtain a water-in-xylene emulsion (water-in-oil type) which is apt to reverse on more vigorous shaking and further dilution with water.

If in doubt as to this property, comparison with a resin obtained from para-tertiary butylphenol and formaldehyde (ratio 1 part phenol to 1.1 formaldehyde) using an acid catalyst and then followed by oxyalkylation using 2 moles of ethylene oxide for each phenolic hydroxyl, is helpful. Such resin prior to oxyalkylation has a molecular weight indicating about 4½ units per resin molecule. Such resin, when diluted with an equal weight of xylene, will serve to illustrate the above emulsification test.

In a few instances, the resin may not be sufficiently soluble in xylene alone but may require the addition of some ethylene glycol diethylether as described elsewhere. It is understood that such mixture, or any other similar mixture, is considered the equivalent of xylene for the purpose of this test.

In many cases, there is no doubt as to the presence or absence of hydrophile or surface-active characteristics in the products used in accordance with this invention. They dissolve or disperse in water; and such dispersions foam readily. With borderline cases, i. e., those which show only incipient hydrophile or surface-active property (sub-surface-activity) tests for emulsifying properties or self-dispersibility are useful. The fact that a reagent is capable of producing a dispersion in water is proof that it is distinctly hydrophile. In doubtful cases, comparison can be made with the butylphenol-formaldehyde resin analog wherein 2 moles of ethylene oxide have been introduced for each phenolic nucleus.

The presence of xylene or an equivalent water-insoluble solvent may mask the point at which a solvent-free product on mere dilution in a test tube exhibits self-emulsification. For this reason, if it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas in presence of xylene such properties would not be noted. In other cases, the first objective indication of hydrophile properties may be the capacity of the material to emulsify an insoluble solvent such as xylene. It is to be emphasized that hydrophile properties herein referred to are such as those exhibited by incipient self-emulsification or the presence of emulsifying properties and go through the range of homogeneous dispersibility or admixture with water even in presence of added water-insoluble solvent and minor proportions of common electrolytes as occur in oil field brines.

Elsewhere, it is pointed out that an emulsification test may be used to determine ranges of surface-activity and that such emulsification tests employ a xylene solution. Stated another way, it is really immaterial whether a xylene solution produces a sol or whether it merely produces an emulsion.

In light of what has been said previously in regard to the variation of range of hydrophile properties, and also in light of what has been said as to the variation in the effectiveness of various alkylene oxides, and most particularly of all ethylene oxide, to introduce hydrophile character, it becomes obvious that there is a wide variation in the amount of alkylene oxide employed, as long as it is at least 2 moles per phenolic nucleus, for producing products useful for the practice of this invention. Another variation is the molecular size of the resin chain resulting from reaction between the difunctional phenol and the aldehyde such as formaldehyde. It is well known that the size and nature or structure of the resin polymer obtained varies somewhat with the conditions of reaction, the proportions of reactants, the nature of the catalyst, etc.

Based on molecular weight determinations, most of the resins prepared as herein described, particularly in the absence of a secondary heating step, contain 3 to 6 or 7 phenolic nuclei with approximately 4½ or 5½ nuclei as an average. More drastic conditions of resinification yield resins of greater chain length. Such more intensive resinification is a conventional procedure and may be employed if desired. Molecular weight, of course, is measured by any suitable procedure, particularly by cyroscopic methods; but using the same reactants and using more drastic conditions of resinification one usually finds that higher molecular weights are indicated by higher melting points of the resins and a tendency to decreased solubility. See what has been said elsewhere herein in regard to a secondary step involving the heating of a resin with or without the use of vacuum.

We have previously pointed out that either an alkaline or acid catalyst is advantageously used in preparing the resin. A combination of catalysts is sometimes used in two stages; for instance, an alkaline catalyst is sometimes employed in a first stage, followed by neutralization and addition of a small amount of acid catalyst in a second stage. It is generally believed that even in the presence of an alkaline catalyst, the number of moles of aldehyde, such as formaldehyde, must be greater than the moles of phenol employed in order to introduce methylol groups in the intermediate stage. There is no indication that such groups appear in the final resin if prepared by the use of an acid catalyst. It is possible that such groups may appear in the finished resins prepared solely with an alkaline catalyst; but we have never been able to confirm this fact in an examination of a large number of resins prepared by ourselves. Our preference, however, is to use an acid-catalyzed resin, particularly employing a formaldehyde-to-phenol ratio of 0.95 to 1.20 and, as far as we have been able to determine, such resins are free from methylol groups. As a matter of fact, it is probable that in acid-catalyzed resinifications, the methylol structure may appear only momentarily at the very beginning of the reaction and in all probability is converted at once into a more complex structure during the intermediate stage.

One procedure which can be employed in the use of a new resin to prepare products for use in the process of the invention is to determine the hydroxyl value by the Verley-Bölsing method or its equivalent. The resin as such, or in the form of a solution as described, is then treated with ethylene oxide in presence of 0.5% to 2% of sodium methylate as a catalyst in step-wise fashion. The conditions of reaction, as far as time or per cent are concerned, are within the range previously indicated. With suitable agitation the ethylene oxide, if added in molecular proportion, combines within a comparatively short time, for instance a few minutes to 2 to 6 hours, but in some instance requires as much as 8 to 24 hours. A useful temperature range is from 125° to 225° C. The completion of the reaction of each addition of ethylene oxide in step-wise fashion is usually indicated by the reduction or elimination of pressure. An amount conveniently used for each addition is generally equivalent to a mole or two moles of ethylene oxide per hydroxyl radical. When the amount of ethylene oxide added is equivalent to approximately 50% by weight of the original resin, a sample is tested for incipient hydrophile properties by simply shaking up in water as is, or after the elimination of the solvent if a solvent is present. The amount of ethylene oxide used to obtain a useful demulsifying agent as a rule varies from 70% by weight of the original resin to as much as five or six times the weight of the original resin. In the case of a resin derived from para-tertiary butylphenol, as little as 50% by weight of ethylene oxide may give suitable solubility. With propylene oxide, even a greater molecular proportion is required and sometimes a resultant of only limited hydrophile properties is obtainable. The same is true to even a greater extent with butylene oxide. The hydroxylated alkylene oxides are more effective in solubilizing properties than the comparable compounds in which no hydroxyl is present.

Attention is directed to the fact that in the subsequent examples reference is made to the step-wise addition of the alkylene oxide, such as ethylene oxide. It is understood, of course, there is no objection to the continuous addition of alkylene oxide until the desired stage of reaction is reached. In fact, there may be less of a hazard involved and it is often advantageous to add the alkylene oxide slowly in a continuous stream and in such amount as to avoid exceeding the higher pressures noted in the various examples or elsewhere.

It may be well to emphasize the fact that when resins are produced from difunctional phenols and some of the higher aliphatic aldehydes, such as acetaldehyde, the resultant is a comparatively soft or pitch-like resin at ordinary temperatures. Such resins become comparatively fluid at 110° to 165° C. as a rule, and thus can be readily oxyalkylated, preferably oxyethylated, without the use of a solvent.

What has been said previously is not intended to suggest that any experimentation is necessary to determine the degree of oxyalkylation, and particularly oxyethylation. What has been said previously is submitted primarily to emphasize the fact that these remarkable oxyalkylated resins having surface activity show unusual properties as the hydrophile character varies from a minimum to an ultimate maximum. One should not underestimate the utility of any of these products in a surface-active or sub-surface-active range without testing them for demulsification. A few simple laboratory tests which can be conducted in a routine manner will usually give all the information that is required.

For instance, a simple rule to follow is to prepare a resin having at least three phenolic nuclei and being organic solvent-soluble. Oxyethylate such resin, using the following four ratios of moles of ethylene oxide per phenolic unit equivalent: 2 to 1; 6 to 1; 10 to 1; and 15 to 1. From a sample of each product remove any solvent that may be present, such as xylene. Prepare 0.5% and 5.0% solutions in distilled water, as previously indicated. A mere examination of such series will generally reveal an approximate range of minimum hydrophile character, moderate hydrophile character, and maximum hydrophile character. If the 2 to 1 ratio does not show minimum hydrophile character by test of the solvent-free product, then one should test its capacity to form an emulsion when admixed with xylene or other insoluble solvent. If neither test shows the required minimum hydrophile property, repetition using 2½ to 4 moles per phenolic nucleus will serve. Moderate hydrophile character should be shown by either the 6 to 1 or 10 to 1 ratio. Such moderate hydrophile character is indicated by the fact that the sol in distilled water within the previously mentioned concentration range is a permanent translucent sol when viewed in a comparatively thin layer, for instance the depth of a test tube. Ultimate hydrophile character is usually shown at the 15 to 1 ratio test in that adding a small amount of an insoluble solvent, for instance 5% of xylene, yields a product which will give, at least temporarily, a transparent or translucent sol of the kind just described. The formation of a permanent foam, when a 0.5% to 5.0% aqueous solution is shaken, is an excellent test for surface activity. Previous reference has been made to the fact that other oxyalkylating agents may require the use of increased amounts of alkylene oxide. However, if one does not even care to go to the trouble of calculating molecular weights, one can simply arbitrarily prepare compounds containing ethylene oxide equivalent to about 50% to 75% by weight, for example 65% by weight, of the resin to be oxyethylated; a second example using approximately 200% to 300% by weight, and a third example using about 500% to 750% by weight, to explore the range of hydrophile-hydrophobe balance.

A practical examination of the factor of oxyalkylation level can be made by a very simple test using a pilot plant autoclave having a capacity of about 10 to 15 gallons as hereinafter described. Such laboratory-prepared routine compounds can then be tested for solubility and, generally speaking, this is all that is required to give a suitable variety covering the hydrophile-hydrophobe range. All these tests, as stated, are intended to be routine tests and nothing more. They are intended to teach a person, even though unskilled in oxyethylation or oxyalkylation, how to prepare in a perfectly arbitrary manner, a series of compounds illustrating the hydrophile-hydrophobe range.

If one purchases a thermoplastic or fusible resin on the open market selected from a suitable number which are available, one might have to make certain determinations in order to make the quickest approach to the appropriate oxyalkylation range. For instance, one should know (a) the molecular size, indicating the number of phenolic units; (b) the nature of the aldehydic residue, which is usually CH₂; and (c) the nature of the substituent. With such information one is in substantially the same position as if one had personally made the resin prior to oxyethylation.

For instance, the molecular weight of the internal structural units of the resin of the following over-simplified formula:

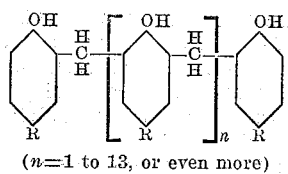

($n=1$ to 13, or even more)

is given approximately by the formula: (mol. wt. of phenol $-2$) plus mol. wt. of methylene or substituted methylene radical. The molecular weight of the resin would be $n$ times the value for the internal unit plus the values for the terminal units. The left-hand terminal unit of the above structural formula, it will be seen, is identical with the recurring internal unit except that it has one extra hydrogen. The right-hand terminal unit lacks the methylene bridge element. Using one internal unit of a resin as the basic element, a resin's molecular weight is given approximately by taking ($n$ plus 2) times the weight of the internal element. Where the resin molecule has only 3 phenolic nuclei as in the structure shown, this calculation will be in error by several per cent; but as it grows larger, to contain 6, 9, or 12 phenolic nuclei, the formula comes to be more than satisfactory. Using such an approximate weight, one need only introduce, for example, two molal weights of ethylene oxide or slightly more, per phenolic nucleus, to produce a product of minimal hydrophile character. Further oxyalkylation gives enhanced hydrophile character. Although we have prepared and tested a large number of oxyethylated products of the type described herein, we have found no instance where the use of less than 2 moles of ethylene oxide per phenolic nucleus gave desirable products.

The following Examples 1b to 10b are included to exemplify the production of suitable oxyalkylated products from resins, specifically, resins described in a number of the foregoing Examples 1a to 20a, giving exact and complete details for the carrying out of the procedure. We direct attention to Examples 1a to 20ба and Examples 1b to 16b and 20b to 25b of our application Serial No. 8,722 as illustrating the same matters.

*Example 1b*

The resin employed is the acid-catalyzed paratertiary butylphenol-formaldehyde resin of Example 1a. (Such resin can be purchased in the open market.) The resin is powdered and mixed with an equal weight of xylene so as to obtain solution by means of a stirring device employing a reflux condenser. 170 grams of the resin are dissolved in or mixed with 170 grams of xylene. To the mixture there is added 1.7 grams of sodium methylate powder. The solution or suspension is placed in an autoclave and approximately 400 grams of ethylene oxide by weight are added in 6 portions of approximately 65 to 75 grams each. After each portion is added, the reaction is permitted to take place for approximately 4 hours. The temperature employed is approximately 150° to 165° C. and a maximum gauge pressure of approximately 150 pounds per square inch. The minimum gauge pressure is approximately 20 pounds per square inch. At the end of each 4-hour period there is no further drop in pressure, thus indicating that all the ethylene oxide present has reacted and the pressure registered on the gauge represents the vapor pressure of xylene at the indicated temperature. After the sixth and final portion of ethylene oxide has been added, a test is made on the resultant.

In one such operation, the resultant, when cold, was a viscous opaque liquid, emulsifiable in water even in presence of the added xylene. This indicated that incipient emulsification in absence of xylene probably appeared at the completion of the fourth addition of ethylene oxide. In other words, 150 grams or 175 grams of ethylene oxide are sufficient to give incipient hydrophile properties in absence of xylene. The initial point approximates ethylene oxide equal to slightly less than 100% of the weight of the initial resin. In this instance in order to obtain greater solubility, the amount of ethylene oxide used for reaction was increased by a second series of additions using substantially the same conditions of reaction as noted previously. Such series was continued until, as an upper limit, 500 grams of ethylene oxide had been introduced on the basis of the original 170 grams of resin. See the attached table for data as to the compound in which the ratio of ethylene oxide to resin is about 2:1. A compound of this constitution, containing a small amount of xylene, was light amber in color, miscible with water and had a viscosity resembling that of castor oil.

*Example 2b*

The same reactants, and procedure were employed as in Example 1b preceding, except that propylene oxide was employed instead of ethylene oxide. The resultant, even on the addition of the alkylene oxide in the weight proportions of the previous example, has diminished hydrophile properties in comparison with the resultants of Example 1b. This illustrates the point that propylene oxide and butylene oxide give products of lower levels of hydrophile properties than does ethylene oxide.

*Example 3b*

The same reactants and procedure were followed as in Example 1b, except that one mole of glycide was employed initially per hydroxyl radical. This particular reaction was conducted with extreme care and the glycide was added in small amounts representing fractions of a mole. Ethylene oxide was then added, following the procedure of Example 1b, to produce products of greater hydrophile properties. We are extremely hesitant to suggest even the experimental use of glycide and methylglycide for the reason that disastrous results may be obtained even in experimentation with laboratory quantities.

*Example 4b*

The same procedure is followed as in Example 1b except that instead of employing the resin employed in Example 1b, there was substituted instead an equal weight of resin of Example 2a. The products obtained were similar in appearance, color and viscosity to those of Example 1b.

*Example 5b*

The same reactants and procedure are employed as in Example 1b, except that the acid catalyzed amylphenol formaldehyde resin of Example 3a is used. (Such resin can be purchased in the open market.) The oxyethylated products in color, appearance, viscosity, etc., are like the products of Example 1b.

*Example 6b*

The same reactants and procedure were employed as in Example 1b, except that the acid-catalyzed styrylphenol-formaldehyde resin of Example 11a was used instead of the butylphenol resin. The oxyethylated products are similar in appearance, color, solubility, etc., to the products of Example 1b.

*Example 7b*

The acid catalyzed resin derived from parahydroxy menthylbenzoate in the manner of Example 16a was oxyethylated. 100 grams of this resin were dissolved in a mixture of 50 grams of xylene and 50 grams of diethyleneglycol diethylether. To this mixture was added three grams of sodium methylate. The mixture was placed in an autoclave and treated with seven successive batches of ethylene oxide. The following table tabulates the data in connection with such treatment:

| Batch | EtO Added | Time Required | Max. Temp. | Max. Pressure | Remarks as to solubility and appearance |
|---|---|---|---|---|---|
| | Grams | Hours | ° C. | #/sq. in. g. p. | |
| 1 | 50 | 4 | 162 | 88 | A viscous opaque liquid; some tendency to emulsify. |
| 2 | 50 | 3 | 150 | 132 | Same as before; more tendency to emulsify. |
| 3 | 50 | 3 | 150 | 130 | Viscosity of liquid reduced; tends to produce a milky emulsion. |
| 4 | 50 | 3½ | 158 | 135 | Some tendency to stratify but when mixed together was definitely water emulsifiable. |
| 5 | 50 | 5 | 157 | 130 | Non-viscous amber oil clearly homogeneous; gives a milky emulsion. |
| 6 | 50 | 5 | 160 | 135 | Light colored amber oil; produces an emulsion of reduced milkiness. |
| 7 | 50 | 5½ | 145 | 135 | Light colored amber oil with even less milkiness and reasonably satisfactory solution. |

*Example 8b*

The same procedure was followed as in Example 7b except that the resin employed was that of Example 13a.

*Example 9b*

The same procedure was followed as in Example 7b except that the resin employed was that of Example 14a.

*Example 10b*

The same procedure was followed as in Example 7b except that the resin employed was that of Example 15a.

The resins, prior to oxyalkylation, vary from tacky, viscous liquids to hard, high-melting solids. Their color varies from a light yellow through amber, to a deep red or even almost black. In the manufacture of resins, particularly hard resins, as the reaction progresses the reaction mass frequently goes through a liquid state to a sub-resinous or semi-resinous state, often characterized by being tacky or sticky, to a final complete resin. As the resin is subjected to oxyalkylation these same physical changes tend to take place in reverse. If one starts with a solid resin, oxyalkylation tends to make it tacky or semi-resinous and further oxyalkylation makes the tackiness disappear and changes the product to a liquid. Thus, as the resin is oxyalkylated it decreases in viscosity, that is, becomes more liquid or changes from a solid to a liquid, particularly when it is converted to the water-dispersible or water-soluble stage. The color of the oxyalkylated derivative is usually considerably lighter than the original product from which it is made, varying from a pale straw color to an amber or reddish amber. The viscosity usually varies from that of an oil, like castor oil, to that of a thick viscous sirup. Some products are waxy. The presence of a solvent, such as 15% xylene or the like, thins the viscosity considerably and also reduces the color by dilution. No undue significance need be attached to the color for the reason that if the same compound is prepared in glass and in iron, the latter usually has somewhat darker color. If the resins are prepared as customarily employed in varnish resin manufacture, i. e., a procedure that excludes the presence of oxygen during the resinification and subsequent cooling of the resin, then of course the initial resin is much lighter in color. We have employed some resins which initially are almost water-white and also yield a lighter colored final product.

The same procedure as described above has been applied to a large variety of resins of the kind described previously, including resins obtained from mixtures of phenols, and we have found that these oxyalkylated products having the required minimum hydrophile properties, are all effective for use in the process of the invention. In many cases resins used were obtained from aldehydes other than formaldehyde, i. e., higher aldehydes having not over 8 carbon atoms. Similarly, some of the resins instead of being obtained by use of acid catalysts were obtained by use of alkaline catalysts or sequential use of both types of catalyst. In some instances the resins were obtained by a process which involved a secondary step of heating alone or under vacuum. In the series of examples represented by Example 1b through 10b and the examples of application Serial No. 8,722, the amount of alkylene oxide added covers the range up to about three times the weight of the initial resin. In our application Serial No. 8,722 there is a table which illustrates the effect of oxyalkylation of a wide range of phenolic resins, and show that many effective compounds for demulsification purposes require but about one-half this amount of alkylene oxide compound, in particular ethylene oxide, for example, from 150% to 200% by weight. Of the products illustrated in the table in said application Serial No. 8,722, those derived from products illustrated by Examples 1a to 206a of that application are useful for the practice of the present invention and illustrate it. Larger amounts of ethylene oxide, for example, amounts up to six times the weight of the initial resin may be used, even though the solubility of such products many in some cases be less than the solubility of derivatives obtained with lesser amounts of alkylene oxide.

The oxyethylated products, in the presence of the solvent, were liquids varying in viscosity from relative mobility to a viscosity approaching that of castor oil or lightly blown vegetable oils. They varied in color from straw colored or light amber to very dark brownish or reddish colored. It is to be understood that when these products are used for demulsification, it is unnecessary to separate them from the solvent used in their preparation, and ordinarily commercial products will, if prepared with the use of a solvent, be distributed without removal of the solvent, and frequently with the addition of other solvent materials, other agents, etc.

The following examples, Examples 1c to 3c, are included to illustrate the technique of testing the effectiveness of the demulsifiers against oil field emulsions. It is to be understood that in the industrial use of these products, they are used in accordance with standard practices, some of which are subsequently described.

*Example 1c*

The demulsifier employed was the oxyalkylated derivative of the resin of Example 2a prepared from para-secondary butylphenol and formaldehyde using an acid catalyst oxyethylated with an amount of ethylene oxide equal in weight to the weight of the resin, following the procedure of Example 4b.

The oxyalkylated resin was prepared so the final product represented a 50% solution in xylene. The effectiveness of this oxyalkylated resin was examined by testing it in connection with an emulsion produced at the St. Gabriel field, St. Gabriel, Louisiana. The emulsion as produced was buff in color and contained approximately 70% to 80% B. S. & W., equivalent to 40% water. The oxyalkylated derivative above described was added to 100 cc. of emulsion placed in a 150 cc. bottle. The amount added was equivalent to one part of demulsifier in 25,000 parts of emulsion. The mixture was shaken for three minutes in a shaking machine employing 150 oscillations per minute. The emulsion began to change color at the end of one minute, completely changed color at the end of two minutes, and was obviously breaking, even during the agitation period, by the end of the third minute. At the end of ten minutes of quiescent settling, a distinct water layer had broken out. The emulsion was allowed to stand for one hour at approximately 90° to 100° F. All the water was broken out within less than the hour, giving a clear separation. The gravity of the recovered oil was 34° A. P. I., and the B. S. & W. content was less than $\frac{1}{10}$ of 1%. In large scale use it is not necessary to get a complete resolution within an hour's time and the amount of demulsifier required would be substantially less.

*Example 2c*

The demulsifier employed was the oxyalkylated derivative of the resin of Example 3a prepared from para-tertiary amylphenol and formaldehyde, using an acid catalyst, oxyethylated with an amount of ethylene oxide equal in weight to the weight of the resin following the procedure of Example 5b.

The oxyalkylated resin was prepared so the final product represented a 50% solution in xylene. The effectiveness of this oxyalkylated resin was examined by testing it in connection with an emulsion produced at the South Houston field, South Houston, Texas. The emulsion as produced was brown in color and contained approximately 70% to 75% B. S. & W., equivalent to 37% to 38% water. The oxyalkylated derivative above described was added to 100 cc. of emulsion placed in a 150 cc. bottle. The amount added was equivalent to one part of demulsifier in 25,000 parts of emulsion. The mixture was shaken for three minutes in a shaking machine employing 150 oscillations per minute. The emulsion began to change color at the end of one minute, completely changed color at the end of two minutes and was obviously breaking, even during the agitation period, by the end of the third minute. At the end of ten minutes of quiescent settling, a distinct water layer had broken out. The emulsion was allowed to stand for one hour at approximately 90° to 100° F. All the water was broken out within less than an hour, giving a clear separation. The gravity of the recovered oil was 28° A. P. I., and the B. S. & W. content was less than $\frac{2}{10}$ of 1%.

Example 3c

The demulsifier employed was the oxyalkylated derivative of the resin of Example 11a prepared from styrylphenol and formaldehyde, using an acid catalyst oxyethylated with an amount of ethylene oxide equal in weight to the weight of the resin, following the procedure of Example 9b.

The oxyalkylated resin was prepared so the final product represented a 50% solution in xylene. The effectiveness of this oxyalkylated resin was examined by testing it in connection with an emulsion produced at the Hastings field, Hastings, Texas. The emulsion produced was buff in color and contained approximately 65% to 70% B. S. & W., equivalent to 34% water. The oxyalkylated derivative above described was added to 100 cc. of emulsion placed in a 150 cc. bottle. The amount added was equivalent to one part of demulsifier in 25,000 parts of emulsion. The mixture was shaken for three minutes in a shaking machine employing 150 oscillations per minute. The emulsion began to change color at the end of one minute, completely changed color at the end of two minutes, and was obviously breaking, even during the agitation period, by the end of the third minute. At the end of ten minutes of quiescent settling, a distinct water layer had broken out. The emulsion was allowed to stand for one hour at approximately 90° to 100° F. All the water was broken out within less than an hour, giving a clear separation. The gravity of the recovered oil was 32° A. P. I., and the B. S. & W. content was less than $\frac{2}{10}$ of 1%.

Actually, in considering the ratio of alkylene oxide to add, and we have previously pointed out that this can be pre-determined using laboratory tests, it is our actual preference from a practical standpoint to make tests on a small pilot plant scale. Our reason for so doing is that we make one run, and only one, and that we have a complete series which shows the progressive effect of introducing the oxyalkylating agent, for instance, the ethyleneoxy radicals. Our preferred procedure is as follows: We prepare a suitable resin, or for that matter, purchase it in the open market. We employ 8 pounds of resin and 4 pounds of xylene and place the resin and xylene in a suitable autoclave with an open reflux condenser. We prefer to heat and stir until the solution is complete. We have pointed out that soft resins which are fluid or semi-fluid can be readily prepared in various ways, such as the use of ortho-tertiary amylphenol, ortho-hydroxydiphenyl, or by the use of higher molecular weight aldehydes than formaldehyde. If such resins are used, a solvent need not be added but may be added as a matter of convenience or for comparison, if desired. We then add a catalyst, for instance, 2% of caustic soda, in the form of a 20% to 30% solution, and remove the water of solution or formation. We then shut off the reflux condenser and use the equipment as an autoclave only, and oxyethylate until a total of 60 pounds of ethylene oxide have been added, equivalent to 750% of the original resin. We prefer a temperature of about 150° C. to 175° C. We also take samples at intermediate points as indicated in the following table:

| Percentage: | Pounds of ethylene oxide added per 8 pound batch |
|---|---|
| 50 | 4.0 |
| 66⅔ | 5.33 |
| 75 | 6.0 |
| 100 | 8.0 |
| 150 | 12.0 |
| 200 | 16.0 |
| 300 | 24.0 |
| 400 | 32.0 |
| 500 | 40.0 |
| 600 | 48.0 |
| 750 | 60.0 |

Oxyethylation to 750% can usually be completed within 30 hours and frequently more quickly.

The samples taken are rather small, for instance, 2 to 4 ounces, so that no correction need be made in regard to the residual reaction mass. Each sample is divided in two. One-half the sample is placed in an evaporating dish on the steam bath overnight so as to eliminate the xylene. Then 1.5% solutions are prepared from both series of samples, i. e., the series with xylene present and the series with xylene removed.

Mere visual examination of any samples in solution may be sufficient to indicate hydrophile character or surface activity, i. e., the product is soluble, forming a colloidal sol, or the aqueous solution foams or shows emulsifying property. All these properties are related through adsorption at the interface, for example, a gas-liquid interface or a liquid-liquid interface. If desired, surface activity can be measured in any one of the usual ways using a DuNouy tensiometer or dropping pipette, or any other procedure for measuring interfacial tension. Such tests are conventional and require no further description. Any compound having sub-surface-activity, and all derived from the same resin and oxyalkylated to a greater extent, i. e., those having a greater proportion of alkylene oxide, are useful for the practice of this invention.

Another reason why we prefer to use a pilot plant test of the kind above described is that we can use the same procedure to evaluate tolerance towards a trifunctional phenol such as hydroxybenzene or metacresol satisfactorily. Previous reference has been made to the fact that one can conduct a laboratory scale test which will indicate whether or not a resin, although soluble in solvent, will yield an insoluble rubbery product, i. e., a product which is neither hydrophile nor surface-active, upon oxyethylation, particularly extensive oxyethylation. It is also obvious that one may have a solvent-soluble resin derived from a mixture of phenols having present 1% or 2% of a trifunctional phenol which will result in an insoluble rubber at the ultimate stages of oxyethylation but not in the earlier stages. In other words, with resins from some such phenols, addition of 2 or 3 moles of the oxyalkylating agent per phenolic nucleus, particularly ethylene oxide, gives a surface-active product which is perfectly satisfactory, while more extensive oxyethylation yields an insoluble rubber, that is, an unsuitable product. It is obvious that this present procedure of evaluating trifunctional phenol tolerance is more suitable than the previous procedure.

It may be well to call attention to one result which may be noted in a long drawn-out oxyalkylation, particularly oxyethylation, which would not appear in a normally conducted reaction. Reference has been made to cross-linking and its effect on solubility and also the fact that, if carried far enough, it causes incipient stringiness, then pronounced stringiness, usually followed by a semi-rubbery or rubbery stage. Incipient stringiness, or even pronounced stringiness, or even the tendency toward a rubbery stage, is not objectionable so long as the final product is still hydrophile and at least sub-surface-active. Such material frequently is best mixed with a polar solvent, such as alcohol or the like, and preferably an alcoholic solution is used. The point which we want to make here, however, is this: Stringiness or rubberization at this stage may possibly be the result of etherification. Obviously if a difunctional phenol and an aldehyde produce a non-cross-linked resin molecule and if such molecule is oxyalkylated so as to introduce a plurality of hydroxyl groups in each molecule, then and in that event if subsequent etherification takes place, one is going to obtain cross-linking in the same general way that one would obtain cross-linking in other resinification reactions. Ordinarily there is little or no tendency toward etherification during the oxyalkylation step. If it does take place at all, it is only to an insignificant and undetectable degree. However, suppose that a certain weight of resin is treated with an equal weight of, or twice its weight of, ethylene oxide. This may be done in a comparatively short time, for instance, at 150° or 175° C. in 4 to 8 hours, or even less. On the other hand, if in an exploratory reaction, such as the kind previously described, the ethylene oxide were added extremely slowly in order to take stepwise samples, so that the reaction required 4 or 5 times as long to introduce an equal amount of ethylene oxide employing the same temperature, then etherification might cause stringiness or a suggestion of rubberiness. For this reason if in an exploratory experiment of the kind previously described there appears to be any stringiness or rubberiness, it may be well to repeat the experiment and reach the intermediate stage of oxyalkylation as rapidly as possible and then proceed slowly beyond this intermediate stage. The entire purpose of this modified procedure is to cut down the time of reaction so as to avoid etherification if it be caused by the extended time period.

It may be well to note one peculiar reaction sometimes noted in the course of oxyalkylation, particularly oxyethylation, of the thermoplastic resins herein described. This effect is noted in a case where a thermoplastic resin has been oxyalkylated, for instance, oxyethylated, until it gives a perfectly clear solution, even in the presence of some accompanying water-insoluble solvent such as 10% to 15% of xylene. Further oxyalkylation, particularly oxyethylation, may then yield a product which, instead of giving a clear solution as previously, gives a very milky solution suggesting that some marked change has taken place. One explanation of the above change is that the structural unit indicated in the following way where $8n$ is a fairly large number, for instance, 10 to 20, decomposes and an oxyalkylated resin representing a lower degree of oxyethylation and a less soluble one, is generated and a cyclic polymer of ethylene oxide is produced, indicated thus:

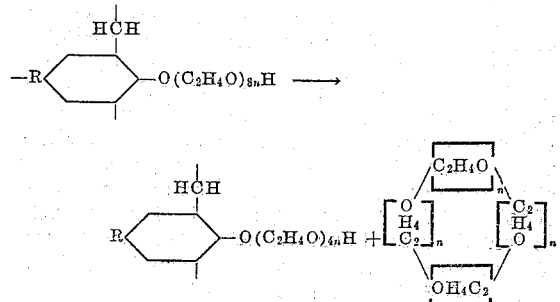

This fact, of course, presents no difficulty for the reason that oxyalkylation can be conducted in each instance stepwise, or at a gradual rate, and samples taken at short intervals so as to arrive at a point where optimum surface activity or hydrophile character is obtained if desired; for products for use in the practice of this invention, this is not necessary and, in fact, may be undesirable, i. e., reduce the efficiency of the product.

We do not know to what extent oxyalkylation produces uniform distribution in regard to phenolic hydroxyls present in the resin molecule. In some instances, of course, such distribution can not be uniform for the reason that we have not specified that the molecules of ethylene oxide, for example, be added in multiples of the units present in the resin molecule. This may be illustrated in the following manner:

Suppose the resin happens to have five phenolic nuclei. If a minimum of two moles of ethylene oxide per phenolic nucleus are added, this would mean an addition of 10 moles of ethylene oxide, but suppose that one added 11 moles of ethylene oxide, or 12, or 13, or 14 moles; obviously, even assuming the most uniform distribution possible, some of the polyethyleneoxy radicals would contain 3 ethyleneoxy units and some would contain 2. Therefore, it is impossible to specify uniform distribution in regard to the entrance of the ethylene oxide or other oxyalkylating agent. For that matter, if one were to introduce 25 moles of ethylene oxide there is no way to be certain that all chains would have 5 units; there might be some having, for example, 4 and 6 units, or for that matter 3 or 7 units. Nor is there any basis for assuming that the number of molecules of the oxyalkylating agent added to each of the molecules of the resin is the same, or different. Thus, where formulae are given to illustrate or depict the oxyalkylated products, distributions of radicals indicated are to be statistically taken. We have, however, included specific directions and specifications in regard to the total amount of ethylene oxide, or total amount of any other oxyalkylating agent, to add.

In regard to solubility of the resins and the oxyalkylated compounds, and for that matter derivatives of the latter, the following should be noted. In oxyalkylation, any solvent employed should be non-reactive to the alkylene oxide employed. This limitation does not apply to solvents used in cryoscopic determinations for obvious reasons. Attention is directed to the fact that various organic solvents may be employed to verify that the resin is organic solvent-soluble. Such solubility test merely characterizes the resin. The particular solvent used in such test may not be suitable for a molecular weight determination and, likewise, the solvent used in determining molecular weight may not be suitable as a solvent during oxyalkylation. For solution of the oxyalkylated compounds, or their derivatives, a great variety of solvents may be employed, such as alcohols, ether alcohols, cresols, phenols, ketones, esters, etc., alone or with the addition of water. Some of these are mentioned hereafter. We prefer the use of benzene or diphenylamine as a solvent in making cryoscopic measurements. The most satisfactory resins are those which are soluble in xylene or the like, rather than those which are soluble only in some other solvent containing elements other than carbon and hydrogen, for instance, oxygen or chlorine. Such solvents are usually polar, semi-polar, or slightly polar in nature compared with xylene, cymene, etc.

Reference to cryoscopic measurement is concerned with the use of benzene or other suitable compound as a solvent. Such method will show that conventional resins obtained, for example, from para-tertiary amylphenol and formaldehyde in presence of an acid catalyst, will have a molecular weight indicating 3, 4, 5 or somewhat greater number of structural units per molecule. If more drastic conditions of resinification are employed or if such low stage resin is subjected to a vacuum distillation treatment as previously described, one obtains a resin of a distinctly higher molecular weight. Any molecular weight determination used, whether cryoscopic measurement or otherwise, other than the conventional cryoscopic one employing benzene, should be checked so as to insure that it gives consistent values on such conventional resins as a control. Frequently all that is necessary to make an approximation of the molecular weight range is to make a comparison with the dimer obtained by chemical combination of two moles of the same phenol, and one mole of the same aldehyde under conditions to insure dimerization. As to the preparation of dimers from substituted phenols, see Carswell, "Phenoplasts," page 31. The increased viscosity, resinous character, and decreased solubility, etc., of the higher polymers in comparison with the dimer, frequently are all that is required to establish that the resin contains 3 or more structural units per molecule.

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of our process.

The present invention is concerned with treatment of petroleum emulsions by means of certain oxyalkylated resins which are hydrophile or sub-surface- or surface-active. Such resins in turn are oxyalkylation-susceptible, water-insoluble, organic solvent-soluble, fusible phenol-aldehyde resins, derived from difunctional phenols having a 2,4,6 substituent. Based on actual large scale application in a large number of oil fields in the United States and certain foreign countries, we believe that this type of material, either as such or in the form of derivatives, will ultimately be employed in no less than 50% of all chemical demulsifying agents used throughout the world.

In practicing our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example 1b, with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

As noted above, the products herein described may be used not only in diluted form, but also may be used admixed with some other chemical demulsifier. For example, attention is directed to the co-pending application of Arthur F. Wirtel, Serial No. 8,734, filed February 16, 1948. That application contemplates, among other things, the use of a mixture comprising:

Oxyalkylated derivative, for example, the product of Example 1b, 20%;

A cyclohexylamine salt of a polypropylated naphthalene monosulfonic acid, 24%;

An ammonium salt of a polypropylated naphthalene mono-sulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

The instant application is concerned with the use of oxyalkylated resinous compounds or derivatives thereof for demulsification of petroleum emulsions of the water-in-oil type. It is obvious that the alicyclic analogues derived by nuclear hydrogenation are equally serviceable for this purpose, and particularly as intermediates for the manufacture of more complex compounds for use as demulsifying agents. In a general way, conversion of the aromatic material to an alicyclic material follows either one or two procedures: One can hydrogenate the resin in a conventional manner, followed by oxyalkylation of the hydrogenated resin in substantially the same manner as is employed in the case of the non-hydrogenated resin. The second procedure is to hydrogenate the oxyalkylated derivative rather than the resin itself. As an example of such procedure, reference is made to our co-pending applications, Serial Nos. 726,201 and 726,204, all filed February 3, 1947, both now abandoned.

Having thus described our invention, what we claim as new and desire to secure by Letters Patent, is:

1. A process for breaking petroleum emulsions of the water-in-oil type characterized by subjecting the emulsion to the action of a demulsifier including a hydrophile oxyalkylated 2,4,6 substituted monocyclic phenol $C_1$- to $C_8$- aldehyde resin in which the ratio of oxyalkylene groups to phenolic nuclei is at least 2:1 and the alkylene radicals of the oxyalkylene groups are selected from the group consisting of ethylene, propylene, butylene, hydroxy propylene and hydroxy butylene radicals.

2. A process for breaking petroleum emulsions of the water-in-oil type, characterized by subjecting the emulsion to the action of a demulsifier including hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent-soluble, water-insoluble, phenol-aldehyde resin; said resin being derived by reaction between a difunctional mono-hydric phenol and an aldehyde having not over 8 carbon atoms and reactive toward said phenol; said resin being formed in the substantial absence of tri-functional phenols; said phenol being of the formula

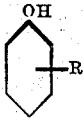

in which R is a substituent in the 2,4,6 position; said oxyalkylated resin being characterized by the introduction into the resin molecule of a plurality of divalent radicals having the formula $(R_1O)_n$ in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

3. A process for breaking petroleum emulsions of the water-in-oil type characterized by subjecting the emulsion to the action of a demulsifier including hydrophile synthetic products; said hydrophile synthetic products being oxalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

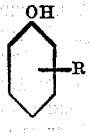

in which R is a substituent in the 2,4,6 position; said oxyalkylated resin being characterized by the introduction into the resin molecule of a plurality of divalent radicals having the formula $(R_1O)_n$ in which $R_1$ is a member selected from the class consisting of ethylene radicals, propylene radicals, hydroxypropylene radicals, and hydroxybutylene radicals, and $n$ is a numeral varying from 1 to 20; with the proviso that at least 2 moles of alkylene oxide be introduced for each phenolic nucleus; and with the final proviso that the hydrophile properties of said oxyalkylated resin in an equal weight of xylene are sufficient to produce an emulsion when said xylene solution is shaken vigorously with one to three volumes of water.

4. A process for breaking petroleum emulsions of the water-in-oil type, characterized by subjecting the emulsion to the action of a demulsifier including hydrophile synthetic products; said hydrophile synthetic products being oxyethylation products of (A) ethylene oxide, and (B) an oxyethylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

in which R is a substituent in the 2,4,6 position; said oxyethylated resin being characterized by the introduction into the resin molecule of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of said oxyethylated resin in an equal weight of xylene are sufficient to produce an emulsion when said xylene solution is shaken vigorously with one to three volumes of water.

5. A process for breaking petroleum emulsions of the water-in-oil type, characterized by subjecting the emulsion to the action of a demulsifier including hydrophile synthetic products; said hydrophile synthetic products being oxyethylation products of (A) ethylene oxide, and (B) an oxyethylation-susceptible, fusible, organic solvent-soluble, water-insoluble, low-stage phenol-aldehyde resin having an average molecular weight corresponding to at least 3 and not over 7 phenolic nuclei per resin molecule; said resin being derived by reaction between a difunctional monohydric phenol and an aldehyde having not over 8 carbon atoms and reactive toward said phenol; said resin being formed in the substantial absence of tri-functional phenols; said phenol being of the formula

in which R is a substituent in the 2,4,6 position; said oxyethylated resin being characterized by the introduction into the resin molecule of a plurality of divalent radicals having the formula $(C_2H_4O)_n$; where $n$ is a numeral varying from 1 to 20; with the proviso that at least 2 moles of ethylene oxide be introduced for each phenolic nucleus; and with the final proviso that the hydrophile properties of said oxyethylated resin in an equal weight of xylene are sufficient to produce an emulsion when said xylene solution is shaken vigorously with one to three volumes of water.

6. A process for breaking petroleum emulsions of the water-in-oil type, characterized by subjecting the emulsion to the action of a demulsifier including hydrophile synthetic products; said hydrophile synthetic products being oxyethylation products of (A) ethylene oxide, and (B) an oxyethylation-susceptible, fusible, organic solvent-soluble, water-insoluble, low-stage phenol-aldehyde resin having an average molecular weight corresponding to at least 3 and not over 7 phenolic nuclei per resin molecule; said resin being derived by reaction between a difunctional monohydric phenol and an aliphatic aldehyde having not over 8 carbon atoms and reactive toward said phenol; said resin being formed in the substantial absence of trifunctional phenols; said phenol being of the formula

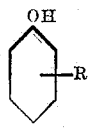

in which R is a substituent in the 2,4,6 position; said oxyethylated resin being characterized by the introduction into the resin molecule of a plurality of divalent radicals having the formula $(C_2H_4O)_n$; where $n$ is a numeral varying from 1 to 20; with the proviso that at least 2 moles of ethylene oxide be introduced for each phenolic nucleus; and with the final proviso that the hydrophile properties of said oxyethylated resin in an equal weight of xylene are sufficient to produce an emulsion when said xylene solution is shaken vigorously with one to three volumes of water.

7. A process for breaking petroleum emulsions of the water-in-oil type, characterized by subjecting the emulsion to the action of a demulsifier including hydrophile synthetic products; said hydrophile synthetic products being oxyethylation products of (A) ethylene oxide; and (B) an oxyethylation-susceptible, fusible, organic solvent-soluble, water-insoluble, low-stage phenol-formaldehyde resin having an average molecular weight corresponding to at least 3 and not over 7 phenolic nuclei per resin molecule and said resin being derived by reaction between a difunctional monohydric phenol and formaldehyde; said resin being formed in the substantial absence of trifunctional phenols; said phenol being of the formula

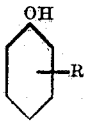

in which R is a substituent in the 2,4,6 position; said oxyethylated resin being characterized by the introduction into the resin molecule of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of said oxyethylated resin in an equal weight of xylene are sufficient to produce an emulsion when said xylene solution is shaken vigorously with one to three volumes of water.

8. A process for breaking petroleum emulsions of the water-in-oil type, characterized by subjecting the emulsion to the action of a demulsifier including hydrophile synthetic products; said hydrophile synthetic products being oxyethylation products of (A) ethylene oxide, and (B) an oxyethylation-susceptible, fusible, organic solvent-soluble, water-insoluble, low-stage, acid-catalyzed phenol-formaldehyde resin having an average molecular weight corresponding to at least 3 and not over 7 phenolic nuclei per resin molecule and said resin being derived by reaction between a difunctional monohydric phenol and formaldehyde; said resin being formed in the substantial absence of trifunctional phenols; said phenol being of the formula

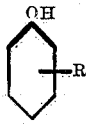

in which R is a substituent in the 2,4,6 position; said oxyethylated resin being characterized by the introduction into the resin molecule of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of said oxyethylated resin in an equal weight of xylene are sufficient to produce an emulsion when said xylene solution is shaken vigorously with one to three volumes of water.

9. The process of claim 6 wherein R is substituted in the para position.

10. The process of claim 6 wherein R is a radical containing not over 24 carbon atoms and having in addition to the elements carbon and hydrogen, the element oxygen, and is substituted in the para position.

11. The process of claim 7 wherein R is substituted in the para position.

12. The process of claim 7 wherein R is a radical containing not over 24 carbon atoms and having in addition to the elements carbon and hydrogen, the element oxygen, and is substituted in the para position.

13. The process of claim 8 wherein R is substituted in the para position.

14. The process of claim 8 wherein R is a radical containing not over 24 carbon atoms and having, in addition to the elements carbon and hydrogen, the element oxygen, and is substituted in the para position.

15. A process for breaking petroleum emulsions of the water-in-oil type, characterized by subjecting the emulsion to the action of a demulsifier including hydrophile synthetic products; said hydrophile synthetic products being oxyethylation products of (A) ethylene oxide, (B) an oxyethylation-susceptible, fusible, organic solvent-soluble, water-insoluble, low-stage, acid-catalyzed, phenol-formaldehyde resin having an average molecular weight corresponding to at least 3 and not over 7 phenolic nuclei per resin molecule and said resin being derived by reaction between a difunctional monohydric phenol and formaldehyde; said resin being formed in the substantial absence of trifunctional phenols; said phenol being of the formula

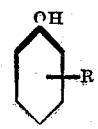

in which R is a carboalkoxy radical substituted in the 2,4,6 position; said oxyethylated resin being characterized by the introduction into the resin molecule of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of said oxyethylated resin in an equal weight of xylene are sufficient to produce an emulsion when said xylene solution is shaken vigorously with one to three volumes of water.

16. The process of claim 15 in which the alkyl radical of the carboalkoxy group is butyl.

17. The process of claim 15 in which the alkyl radical of the carboalkoxy group is amyl.

18. The process of claim 15 in which the alkyl radical of the carboalkoxy group is octyl.

MELVIN DE GROOTE.
BERNHARD KEISER.

REFERENCES CITED

The following references are of record in the file of this patent:

UNITED STATES PATENTS

| Number | Name | Date |
|---|---|---|
| 2,060,410 | Balle | Nov. 10, 1936 |
| 2,076,624 | De Groote | Apr. 13, 1937 |
| 2,243,330 | De Groote et al. | May 27, 1941 |
| 2,278,838 | De Groote et al. | Apr. 7, 1942 |
| 2,307,058 | Moeller | Jan. 5, 1943 |
| 2,317,726 | Boedeker et al. | Apr. 27, 1943 |
| 2,330,474 | De Groote | Sept. 28, 1943 |
| 2,385,970 | De Groote et al. | Oct. 2, 1945 |
| 2,454,541 | Bock et al. | Nov. 23, 1948 |